(12) United States Patent
Campana et al.

(10) Patent No.: US 11,511,846 B2
(45) Date of Patent: *Nov. 29, 2022

(54) AIRCRAFT WITH MULTI SPAR BOX CONNECTION TO FUSELAGE

(71) Applicant: THE BOEING COMPANY, Chicago, IL (US)

(72) Inventors: Joseph H. Campana, Mill Creek, WA (US); William H. Pearson, Redmond, WA (US); Charles R. Coates, Renton, WA (US); Kevin P. Ryder, Kirkland, WA (US); Peter J. Newnham, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 165 days.

This patent is subject to a terminal disclaimer.

(21) Appl. No.: 16/885,022

(22) Filed: May 27, 2020

(65) Prior Publication Data

US 2021/0371080 A1    Dec. 2, 2021

(51) Int. Cl.
*B64C 1/26* (2006.01)
*B64C 5/06* (2006.01)
(Continued)

(52) U.S. Cl.
CPC .............. *B64C 1/26* (2013.01); *B64C 5/06* (2013.01); *B64C 7/00* (2013.01); *B64F 5/10* (2017.01)

(58) Field of Classification Search
CPC .... B64C 1/26; B64C 5/06; B64C 3/18; B64C 3/185; B64C 3/187
See application file for complete search history.

(56) References Cited

U.S. PATENT DOCUMENTS 8,348,196 B2    1/2013   Campana
10,046,848 B2   8/2018   Folch Cortes et al.
(Continued)

FOREIGN PATENT DOCUMENTS

CN      109720544 A        5/2019
DE    102005003296 A1 *   7/2006   ............. B64C 1/061
(Continued)

OTHER PUBLICATIONS

Communication Pursuant to Rule 62 EPC for EP Application No. 21169331.2 dated Oct. 14, 2021.
(Continued)

*Primary Examiner* — Timothy D Collins
*Assistant Examiner* — Justin Michael Heston
(74) *Attorney, Agent, or Firm* — Marshall, Gerstein & Borun LLP

(57) ABSTRACT

An aircraft has a vertical stabilizer having a multi-spar box and a base rib assembly secured to the multi-spar box. The base rib assembly has a pair of middle longitudinal lugs between a front and rear of the base rib assembly, a pair of front lateral lugs along the front of the base rib assembly, and a pair of rear lateral lugs along the rear of the base rib assembly. There are no lateral lugs between the pairs of middle lugs. A pair of middle clevises extend through corresponding apertures in an outer skin of the fuselage and are secured to one of the plurality of frame members and a plurality of retaining members are inserted through mounting holes in each middle longitudinal lug and mounting holes in each middle clevis to secure the vertical stabilizer to the aircraft fuselage.

20 Claims, 24 Drawing Sheets

(51) Int. Cl.
_B64F 5/10_ (2017.01)
_B64C 7/00_ (2006.01)

(56) References Cited

U.S. PATENT DOCUMENTS

| | | | |
|---|---|---|---|
| 2010/0155532 A1* | 6/2010 | Ariza Martin | B64C 1/26 244/119 |
| 2011/0089292 A1* | 4/2011 | Williams | B64C 1/26 29/525.01 |
| 2020/0023934 A1* | 1/2020 | Martino-Gonzalez | B64F 5/10 |
| 2020/0156758 A1* | 5/2020 | Colmenarejo Matellano | B64C 1/065 |

FOREIGN PATENT DOCUMENTS

| | | | |
|---|---|---|---|
| EP | 2444315 | A2 | 4/2012 |
| EP | 3078586 | A1 | 10/2016 |
| EP | 3584152 | A1 | 12/2019 |
| EP | 3653490 | A1 | 5/2020 |

OTHER PUBLICATIONS

Extended European Search Report for EP Application No. 21183492.4 dated Jan. 18, 2022.
https://www.researchgate.net/figure/Airbus-A300-600-vertical-stabilizer-construction_fig1_279693318, Jan. 2006.

* cited by examiner

US 11,511,846 B2

AIRCRAFT WITH MULTI SPAR BOX CONNECTION TO FUSELAGE

FIELD

This disclosure relates generally to aircraft and, more specifically, to connections between vertical stabilizers and fuselage of aircraft.

BACKGROUND

There are currently multiple configurations utilized to connect vertical stabilizers to the fuselage of aircraft. In one configuration, a group of fittings are positioned between the vertical stabilizer and the fuselage, a first group of fasteners is used to attach the vertical stabilizer to the fittings, and a second group of fasteners is used to attach the fuselage to the fittings. However, this type of configuration is difficult to install due to the work required in confined spaces and makes in service inspection difficult. In another configuration, lugs and standard dual wall clevises are used between the vertical stabilizer and the fuselage and oriented in a longitudinal direction and additional lugs and standard dual wall clevises are oriented in a lateral direction and positioned between each of the longitudinal lugs and clevises. However, this type of configuration is difficult to install due to the required attachment of the lateral lugs between mid spars. In yet another configuration, lugs and standard dual wall clevises are used between the vertical stabilizer and the fuselage, but are only oriented laterally and only positioned along the front and rear spar of the vertical stabilizer.

SUMMARY

In one embodiment of the present disclosure, an example aircraft comprises an aircraft fuselage and a vertical stabilizer. The aircraft fuselage has a plurality of frame members and an outer skin and the vertical stabilizer has a multi-spar box. The multi-spar box includes a front spar, a rear spar, at least one mid spar positioned between and spaced apart from the front and rear spars, a first side skin extending between the front and rear spar, and a second side skin, opposite the first side skin, extending between the front and rear spar. The front and rear spars and the first and second side skins define an interior of the multi-spar box. A base rib assembly is positioned in an interior of and secured to the multi-spar box. The base rib assembly has at least one pair of opposing middle longitudinal lugs disposed between a front of the base rib assembly and a rear of the base rib assembly, a pair of front lateral lugs positioned along the front of the base rib assembly, and a pair of rear lateral lugs positioned along the rear of the base rib assembly. The base rib assembly does not have any lateral lugs between the pairs of middle lugs. A pair of middle clevises corresponding to the pair of middle longitudinal lugs extend through corresponding apertures in the outer skin and are secured to one of the plurality of frame members. A plurality of retaining members are inserted through mounting holes in each middle longitudinal lug and through mounting holes in each corresponding middle clevis to secure the vertical stabilizer to the aircraft fuselage.

In one embodiment, in the example aircraft of the previous embodiment, a front lateral clevis is positioned between the pair of front lateral lugs, extends through an aperture in the outer skin, and is secured to one of the plurality of frame members and a rear lateral clevis is positioned between the pair of rear lateral lugs, extends through an aperture in the outer skin, and is secured to one of the plurality of frame members. A first front link interconnects the front lateral clevis and a first front lateral lug of the pair of front lateral lugs, a second front link interconnects the front lateral clevis and a second front lateral lug of the pair of front lateral lugs, a first rear link interconnects the rear lateral clevis and a first rear lateral lug of the pair of rear lateral lugs, and a second rear link interconnects the rear lateral clevis and a second rear lateral lug of the pair of rear lateral lugs.

In one embodiment, in the example aircraft of any of the previous embodiments, a front plate is adjacent an exterior surface of the front spar and is secured to the front spar and the base rib assembly. The front plate has a pair of lateral lugs adjacent to and aligned with the pair of front lateral lugs of the base rib assembly. A rear plate is adjacent an exterior surface of the rear spar, opposite the front plate, and is secured to the rear spar and the base rib assembly. The rear plate has a pair of lateral lugs adjacent to and aligned with the pair of rear lateral lugs of the base rib assembly. A first side plate is adjacent an exterior surface of the first side skin and is secured to the first side skin and the base rib assembly. The first side plate has at least one longitudinal lug adjacent to and aligned with one of the pair of opposing middle longitudinal lugs of the base rib assembly. A second side plate is adjacent an exterior surface of the second side skin and is secured to the second side skin and the base rib assembly. The second side plate has at least one longitudinal lug adjacent to and aligned with the other of the pair of opposing middle longitudinal lugs of the base rib assembly.

In one embodiment, in the example aircraft of any of the previous embodiments, the base rib assembly comprises a pair of opposing front longitudinal lugs and a pair of opposing rear longitudinal lugs. The at least one pair of opposing middle longitudinal lugs is disposed between the pair of front longitudinal lugs and the pair of rear longitudinal lugs, the pair of front lateral lugs is positioned between the pair of front longitudinal lugs, and the pair of rear lateral lugs is positioned between the pair of rear longitudinal lugs.

In one embodiment, in the example aircraft of any of the previous embodiments, a pair of front clevises corresponding to the pair of front longitudinal lugs extend through corresponding apertures in the outer skin and are secured to one of the plurality of frame members. A pair of rear clevises corresponding to the pair of rear longitudinal lugs extend through corresponding apertures in the outer skin and are secured to one of the plurality of frame members. A plurality of retaining members are inserted through mounting holes in each front and rear longitudinal lug and through mounting holes in each corresponding front and rear clevis to secure the vertical stabilizer to the aircraft fuselage.

In one embodiment, in the example aircraft of any of the previous embodiments, a front lateral clevis is positioned between the pair of front clevises, extends through an aperture in the outer skin, and is secured to one of the plurality of frame members. A rear lateral clevis is positioned between the pair of rear clevises, extends through an aperture in the outer skin, and is secured to one of the plurality of frame members. A first front link interconnects the front lateral clevis and a first front lateral lug of the pair of front lateral lugs and a second front link interconnects the front lateral clevis and a second front lateral lug of the pair of front lateral lugs. A first rear link interconnects the rear lateral clevis and a first rear lateral lug of the pair of rear lateral lugs and a second rear link interconnects the rear lateral clevis and a second rear lateral lug of the pair of rear lateral lugs.

In one embodiment, in the example aircraft of any of the previous embodiments, a first front link interconnects a first front lateral lug of the pair of front lateral lugs and a lateral wall of one of the pair of front clevises and a second front link interconnects a second front lateral lug of the pair of front lateral lugs and a lateral wall of the other of the pair of front clevises. A first rear link interconnects a first rear lateral lug of the pair of rear lateral lugs and a lateral wall of one of the pair of rear clevises and a second rear link interconnects a second rear lateral lug of the pair of rear lateral lugs and lateral wall of the other of the pair of rear clevises.

In one embodiment, in the example aircraft of any of the previous embodiments, a front plate is adjacent an exterior surface of the front spar, is secured to the front spar and the base rib assembly, and has a pair of lateral lugs adjacent to and aligned with the pair of front lateral lugs of the base rib assembly. A rear plate is adjacent an exterior surface of the rear spar, opposite the front plate, is secured to the rear spar and the base rib assembly, and has a pair of lateral lugs adjacent to and aligned with the pair of rear lateral lugs of the base rib assembly. A first side plate, a third side plate, and a fifth side plate are adjacent an exterior surface of the first side skin and are secured to the first side skin and the base rib assembly. The first side plate has at least one longitudinal lug adjacent to and aligned with one of the pair of opposing middle longitudinal lugs of the base rib assembly, the third side plate has at least one longitudinal lug adjacent to and aligned with one of the pair of opposing front longitudinal lugs, and the fifth side plate has at least one longitudinal lug adjacent to and aligned with one of the pair of opposing rear longitudinal lugs. A second side plate, a fourth side plate, and a sixth side plate are adjacent an exterior surface of the second side skin and are secured to the second side skin and the base rib assembly. The second side plate has at least one longitudinal lug adjacent to and aligned with the other of the pair of opposing middle longitudinal lugs of the base rib assembly, the fourth side plate has at least one longitudinal lug adjacent to and aligned with the other of the pair of opposing front longitudinal lugs, and the sixth side plate has at least one longitudinal lug adjacent to and aligned with the other of the pair of opposing rear longitudinal lugs.

In one embodiment, in the example aircraft of any of the previous embodiments, each front clevis has a first mounting arm, a second mounting arm, and a third mounting arm, each rear clevis has a first mounting arm, a second mounting arm, and a third mounting arm, and each middle clevis has only a first mounting arm and a second mounting arm. The longitudinal lug of the first side plate and the corresponding middle longitudinal lug of the base rib assembly are positioned between the first mounting arm and the second mounting arm of the corresponding middle clevis. The longitudinal lug of the second side plate and the corresponding middle longitudinal lug of the base rib assembly are positioned between the first mounting arm and the second mounting arm of the corresponding middle clevis. The longitudinal lug of the third side plate is positioned between the first mounting arm and the second mounting arm of the corresponding front clevis and the corresponding front longitudinal lug of the base rib assembly is positioned between the second mounting arm and the third mounting arm of the corresponding front clevis. The longitudinal lug of the fifth side plate is positioned between the first mounting arm and the second mounting arm of the corresponding rear clevis and the corresponding rear longitudinal lug of the base rib assembly is positioned between the second mounting arm and the third mounting arm of the corresponding rear clevis.

In one embodiment, in the example aircraft of any of the previous embodiments, a front lateral clevis is positioned between the pair of front clevises, extends through an aperture in the outer skin, and is secured to one of the plurality of frame members. A rear lateral clevis is positioned between the pair of rear clevises, extends through an aperture in the outer skin, and is secured to one of the plurality of frame members. A first front link interconnects the front lateral clevis and a first front lateral lug of the pair of front lateral lugs and a second front link interconnecting the front lateral clevis and a second front lateral lug of the pair of front lateral lugs. A first rear link interconnects the rear lateral clevis and a first rear lateral lug of the pair of rear lateral lugs and a second rear link interconnecting the rear lateral clevis and a second rear lateral lug of the pair of rear lateral lugs.

In one embodiment, in the example aircraft of any of the previous embodiments, a first front link interconnects a first front lateral lug of the pair of front lateral lugs and a lateral wall of one of the pair of front clevises and a second front link interconnects a second front lateral lug of the pair of front lateral lugs and a lateral wall of the other of the pair of front clevises. A first rear link interconnects a first rear lateral lug of the pair of rear lateral lugs and a lateral wall of one of the pair of rear clevises and a second rear link interconnects a second rear lateral lug of the pair of rear lateral lugs and lateral wall of the other of the pair of rear clevises.

In another embodiment of the present disclosure, an example method of attaching a vertical stabilizer having a multi-spar box to an aircraft fuselage comprises the steps of: assembling a base rib assembly having at least one pair of opposing middle longitudinal lugs disposed between a front of the base rib assembly and a rear of the base rib assembly, a pair of front lateral lugs positioned along the front of the base rib assembly, and a pair of rear lateral lugs positioned along the rear of the base rib assembly, each longitudinal lug and each lateral lug having a corresponding mounting hole, wherein the base rib assembly does not have any lateral lugs between the pairs of middle lugs; inserting the base rib assembly into an interior of the multi-spar box of the vertical stabilizer, the interior of the multi-spar box defined by a front spar, a rear spar, and opposing side skins; positioning a front plate adjacent an exterior surface of the front spar and securing the front plate to the front spar and the base rib assembly, the front plate having a pair of lateral lugs corresponding to the pair of front lateral lugs of the base rib assembly, the lateral lugs of the front plate each having a mounting hole that aligns with the mounting holes in the corresponding lateral lugs of the base rib assembly; positioning a rear plate adjacent an exterior surface of the rear spar, opposite the front plate, and securing the rear plate to the rear spar and the base rib assembly, the rear plate having a pair of rear lateral lugs corresponding to the pair of rear lateral lugs of the base rib assembly, the lateral lugs of the rear plate each having a mounting hole that aligns with the mounting holes in the corresponding lateral lugs of the base rib assembly; positioning a first side plate adjacent an exterior surface of a first side skin of the multi-spar box and securing the first side plate to the first side skin and the base rib assembly, the first side plate having at least one longitudinal lug corresponding to one of the pair of opposing middle longitudinal lugs of the base rib assembly, each of the at least one longitudinal lug of the first side plate having a mounting hole that aligns with the mounting hole in the corresponding middle longitudinal lug of the base rib assembly; positioning a second side plate adjacent an exterior surface of a second side skin of the multi-spar box and securing the second side plate to the second side skin and the base rib assembly, the second side plate having at least one longitudinal lug corresponding to the other of the pair of opposing middle longitudinal lugs of the base rib assembly, each of the at least one longitudinal lug of the second side plate having a mounting hole that aligns with the mounting hole in the corresponding middle longitudinal lug of the base rib assembly; inserting a plurality of clevises through corresponding apertures in a skin of the aircraft fuselage and securing each of the plurality of clevises to a frame member of the aircraft fuselage, each clevis having a pair of mounting arms, each mounting arm having a mounting hole; positioning the vertical stabilizer adjacent the aircraft fuselage and aligning each middle longitudinal lug with a corresponding clevis; and inserting a retaining member through the mounting hole of each corresponding middle longitudinal lug and clevis to secure the vertical stabilizer to the aircraft fuselage.

In one embodiment, in the example method of the previous embodiment, the method comprises the steps of attaching each lateral lug to a first end of a corresponding lateral link and attaching a second end of each lateral link to a lateral clevis.

In one embodiment, in the example aircraft of any of the previous embodiments, each lateral clevis extends through a corresponding aperture in the skin of the aircraft fuselage and is secured to a frame member of the aircraft fuselage.

In one embodiment, in the example aircraft of any of the previous embodiments, the base rib assembly comprises a pair of opposing front longitudinal lugs and a pair of rear longitudinal lugs.

In one embodiment, in the example aircraft of any of the previous embodiments, each lateral clevis is part of a clevis corresponding to a front longitudinal lug or a rear longitudinal lug.

In one embodiment, in the example aircraft of any of the previous embodiments, a first lateral clevis is positioned between the pair of opposing front longitudinal lugs and a second lateral clevis is positioned between the pair of rear longitudinal lugs.

In one embodiment, in the example aircraft of any of the previous embodiments, assembling the base rib assembly comprises: attaching at least one first side chord to a base rib, the at least one first side chord including at least one of the longitudinal lugs; attaching at least one second side chord to the base rib, opposite the at least one first side chord, the at least one second side chord including at least one of the longitudinal lugs; attaching a front terminal fitting to the base rib, the front terminal fitting including the pair of front lateral lugs; and attaching a rear terminal fitting to the base rib, opposite the front terminal fitting, the rear terminal fitting including the pair of rear lateral lugs.

In one embodiment, in the example aircraft of any of the previous embodiments, the method comprises the steps of attaching at least one generally L-shaped shear clip between the base rib assembly and a mid spar of the multi-spar box.

In one embodiment, in the example aircraft of any of the previous embodiments, the clevises corresponding to the front longitudinal lugs and the rear longitudinal lugs each have a third mounting arm positioned between and spaced apart from the pair of mounting arms, the third mounting arm have a mounting hole aligned with the mounting holes in the pair of mounting arms, and the clevises corresponding to the middle longitudinal lugs do not have any additional mounting arms other than the pair of mounting arms.

The features, functions, and advantages that have been discussed can be achieved independently in various embodiments or may be combined in yet other embodiments further details of which can be seen with reference to the following description and drawings.

DESCRIPTION

Figure 1:
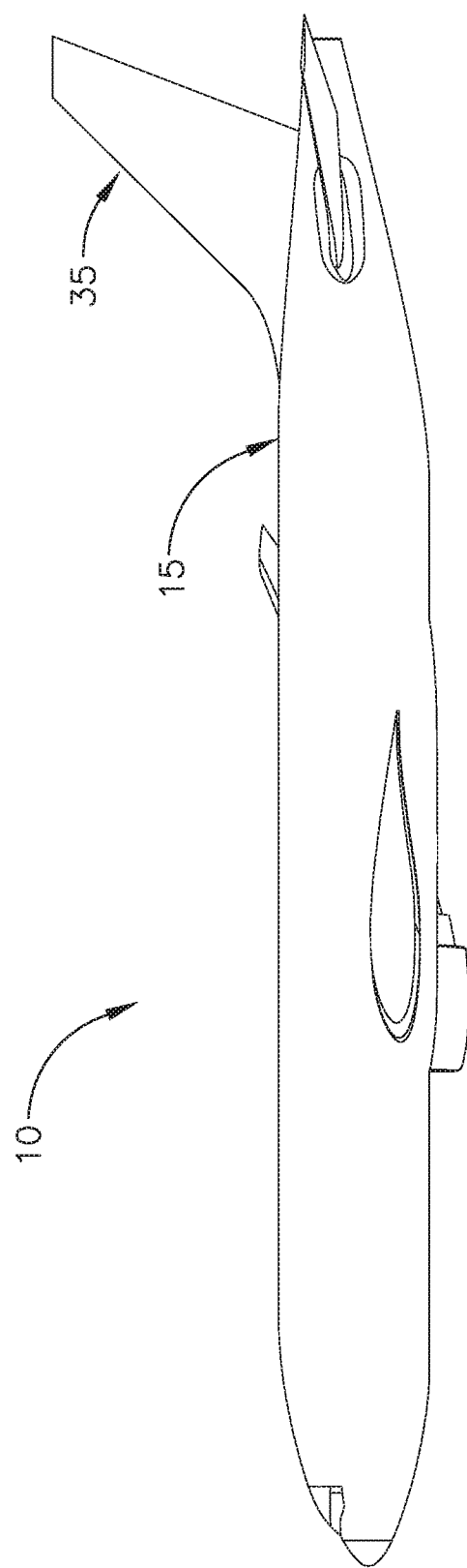
FIG. 1 is a side view of an example aircraft.
Figure 2:
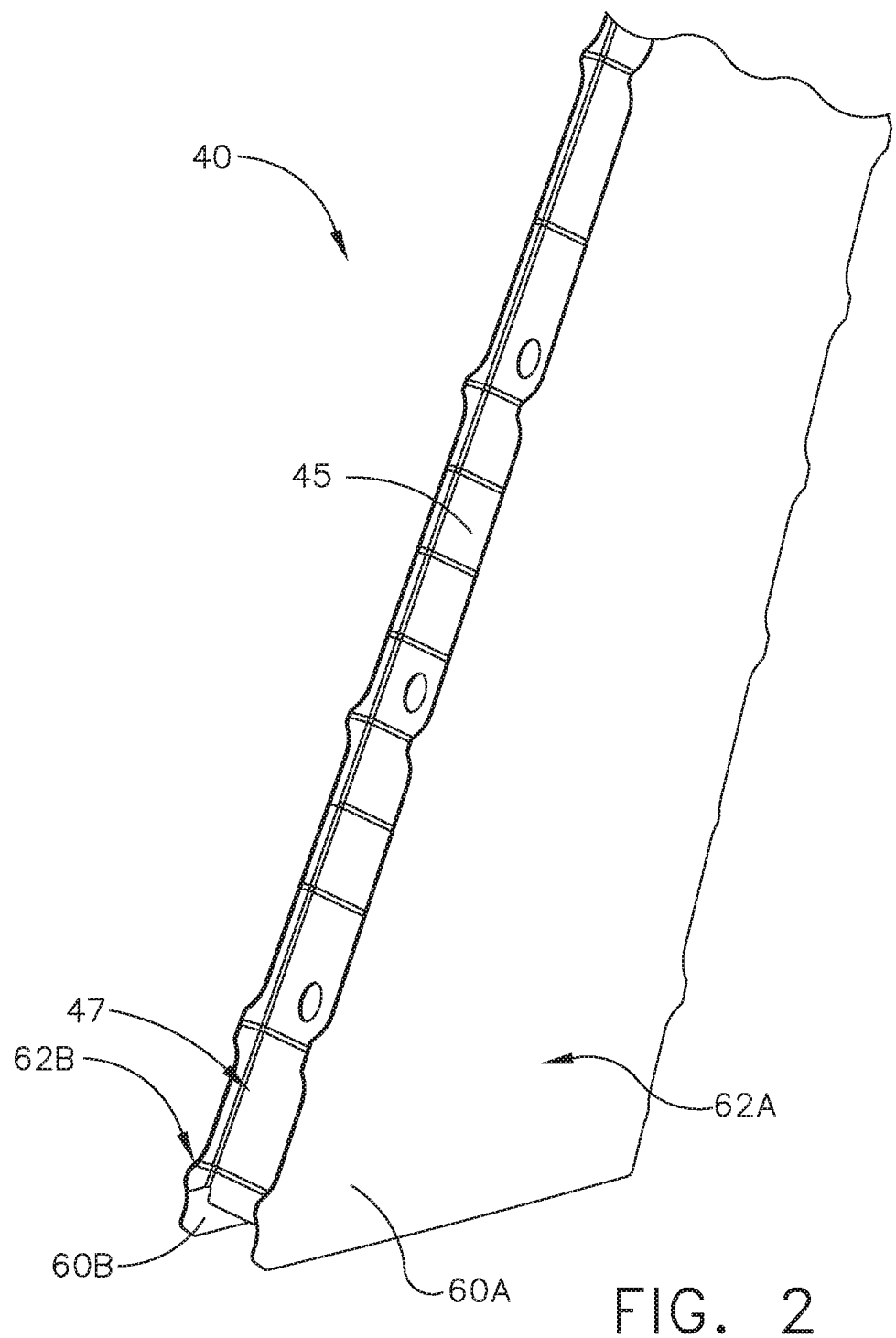
FIG. 2 is a partial perspective view of an example multi-spar box of the vertical stabilizer of the aircraft of FIG. 1.
Figure 3:
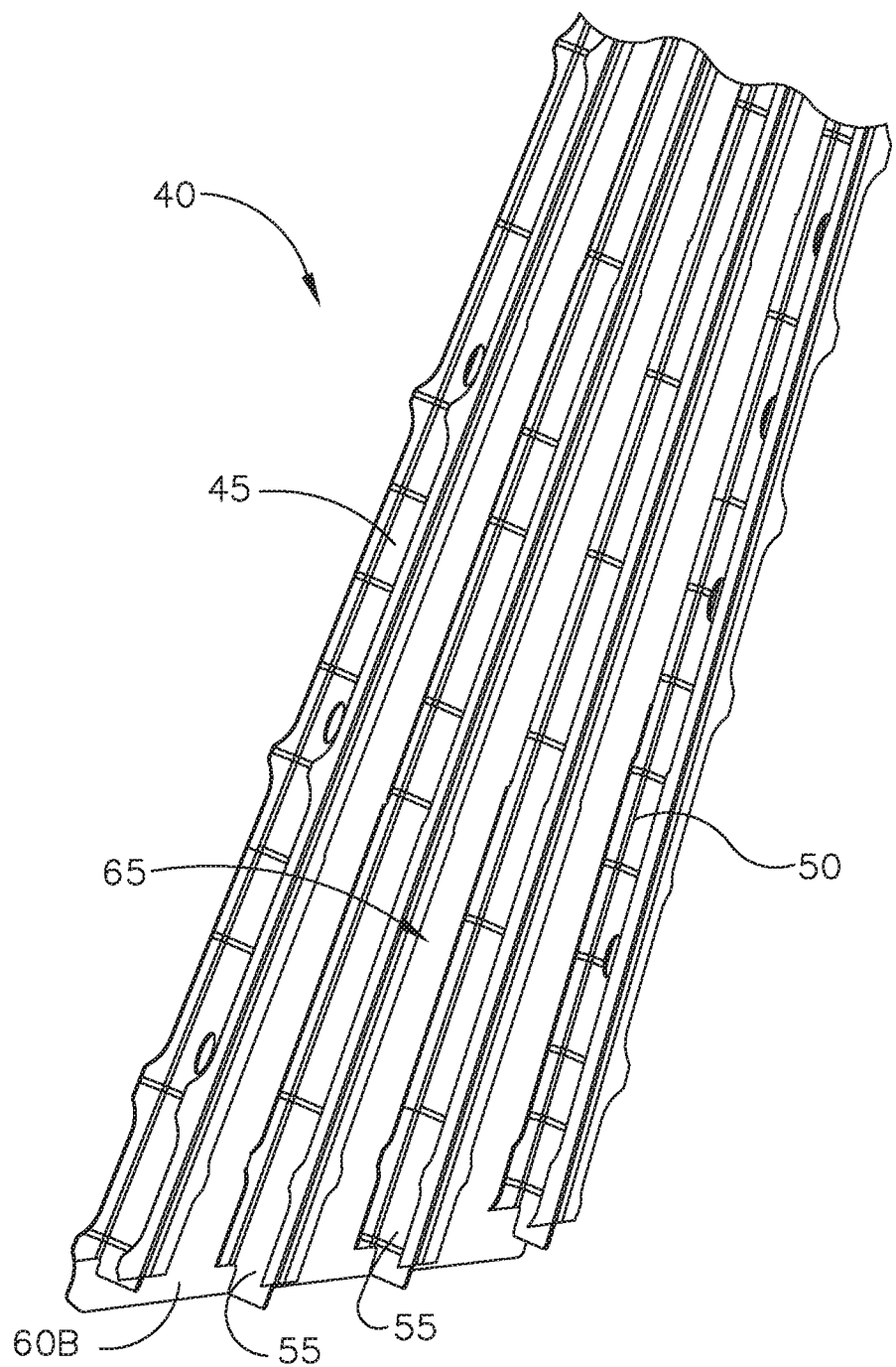
FIG. 3 is a partial perspective view of the multi-spar box of FIG. 2 with a side skin removed.

Referring to FIGS. 1-3, an example aircraft 10 is illustrated having an aircraft fuselage 15 with a plurality of frame members 20 and an outer skin 25 (see FIGS. 8-10, 15-17, and 22-24) and vertical stabilizer 35 with a multi-spar box 40 connected to aircraft fuselage 15. As can be seen in FIGS. 2-3, multi-spar box 40 of vertical stabilizer 35 has a front spar 45, a rear spar 50, and at least one mid spar 55 positioned between and spaced apart from front spar 45 and rear spar 50. In the example shown, multi-spar box 40 has two mid spars 55, but can have any number of mid spars 55 appropriate for a given application. A first side skin 60A and a second side skin 60B, opposite first side skin 60A, extend between front spar 45 and rear spar 50. Front spar 45, rear spar 50, first side skin 60A, and second side skin 60B together define an interior 65 of multi-spar box 40.

Figure 4:
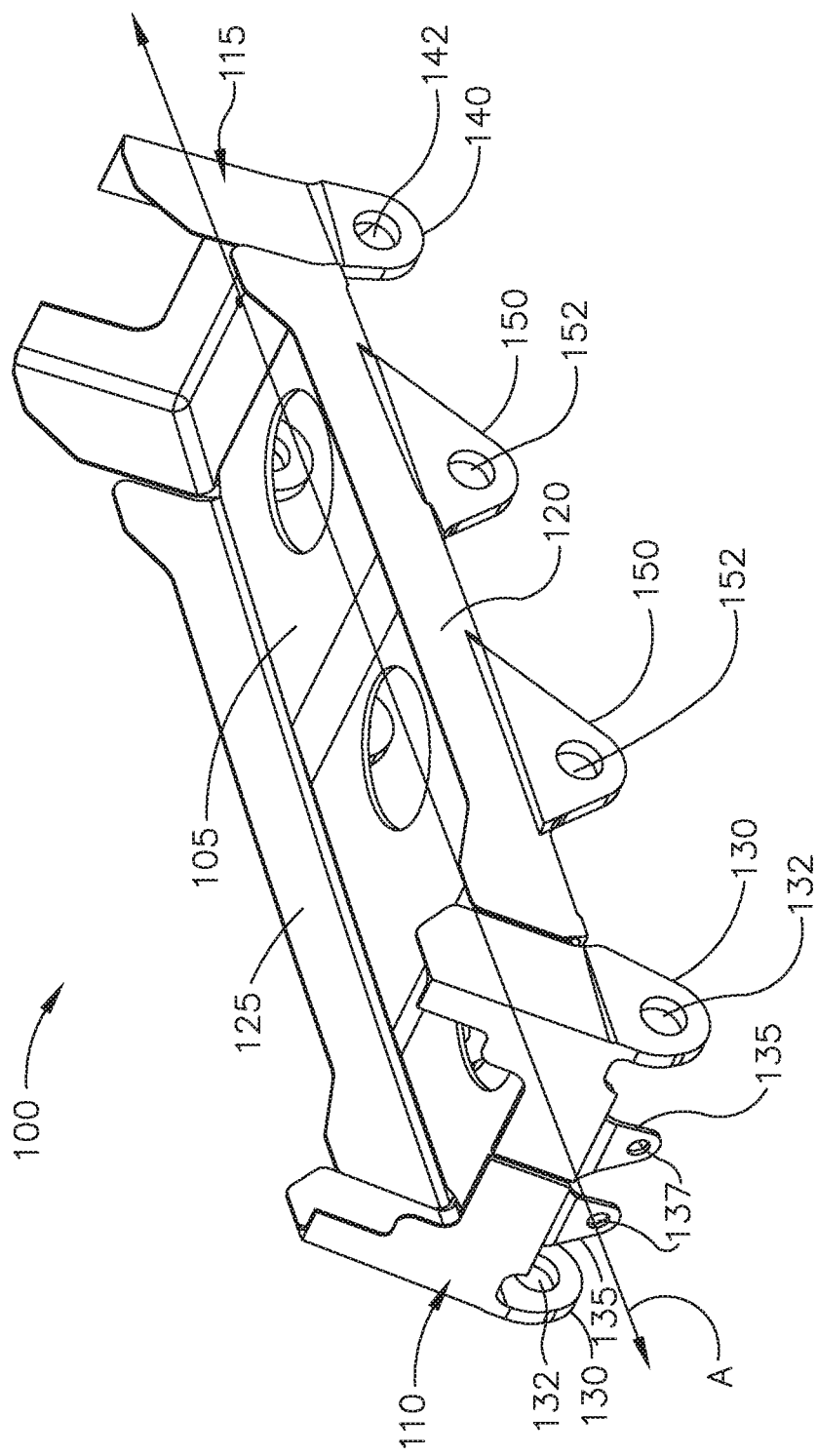
FIG. 4 is a front perspective view of a first example base rib assembly.
Figure 5:
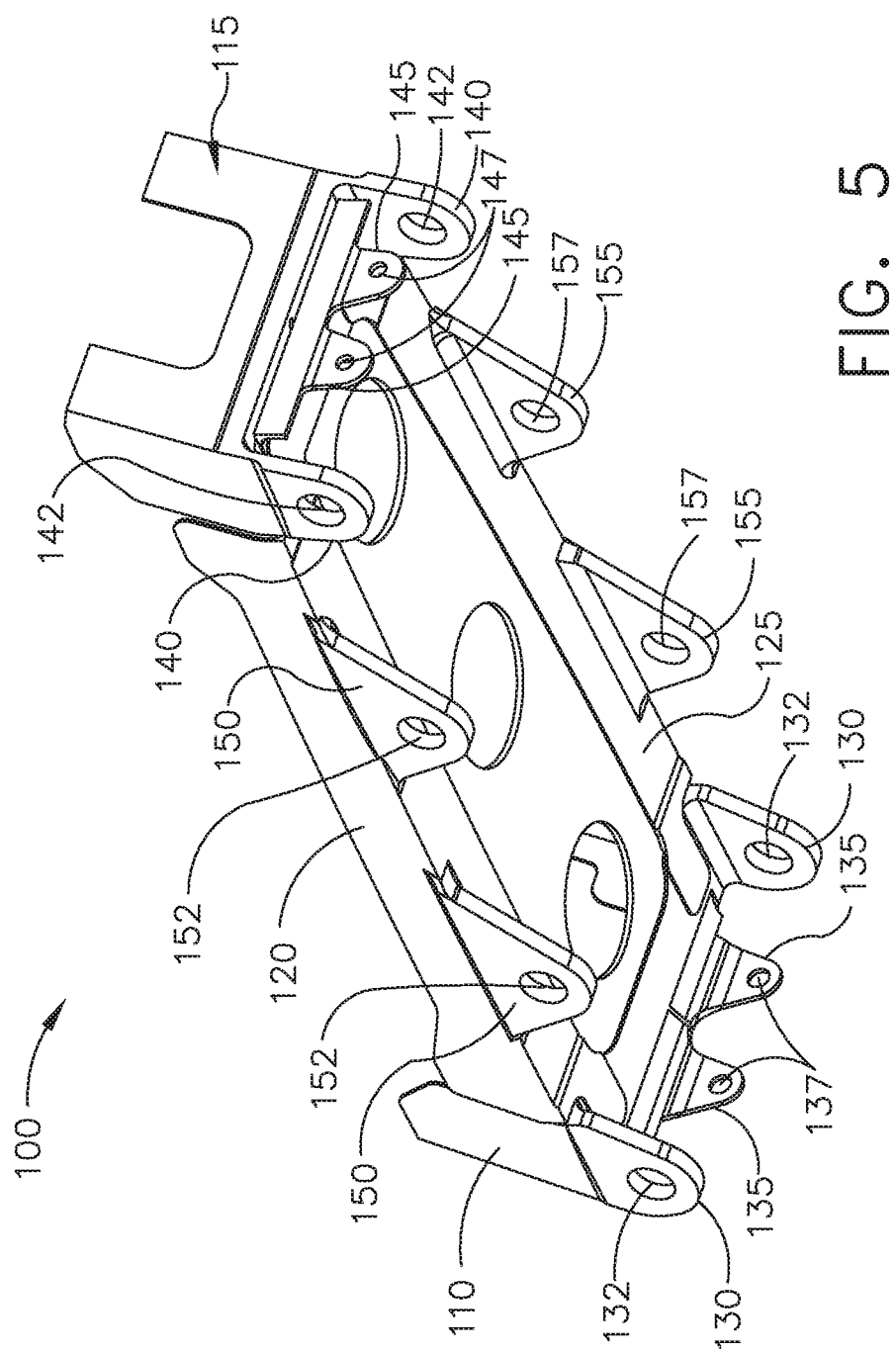
FIG. 5 is a rear perspective view of the base rib assembly of FIG. 4.
Figure 11:
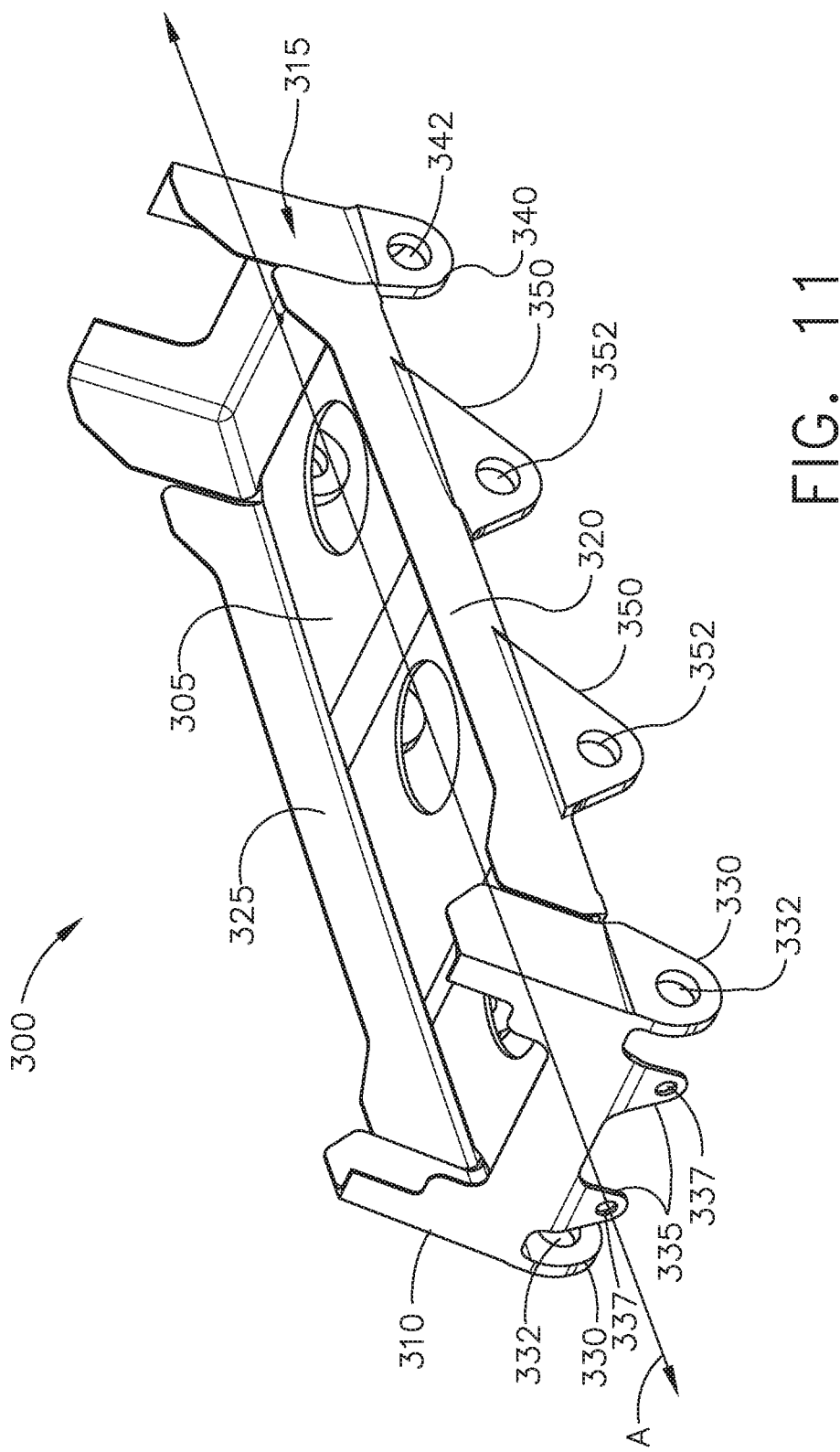
FIG. 11 is a front perspective view of a second example base rib assembly.
Figure 12:
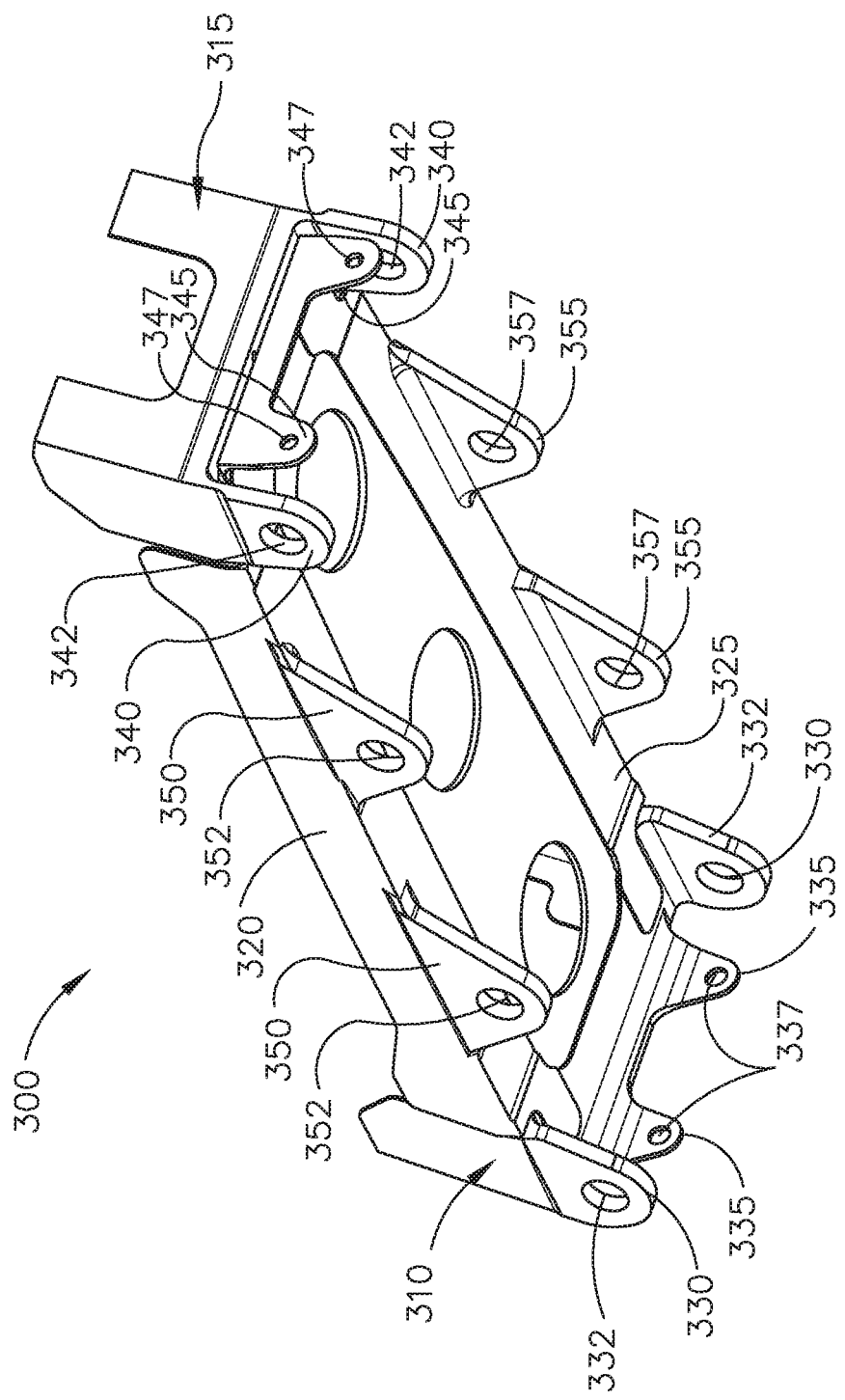
FIG. 12 is a rear perspective view of the base rib assembly of FIG. 11.

Referring to FIGS. 4-10, a first example connection between aircraft fuselage 15 and multi-spar box 40 of vertical stabilizer 35 is shown. As best seen in FIGS. 4-5, a base rib assembly 100 has a base rib 105 and a front terminal fitting 110, rear terminal fitting 115 opposite front terminal fitting 110, first side chord 120, and second side chord 125 opposite first side chord 120, attached to base rib 105. Front terminal fitting 110 includes a pair of opposing front longitudinal lugs 130 extending parallel to a longitudinal axis A of base rib assembly 100 and a pair of front lateral lugs 135 extending perpendicular to longitudinal axis A and positioned between the pair of front longitudinal lugs 130. As shown, front terminal fitting 110 includes two pieces, each having one front longitudinal lug 130 and one front lateral lug 135, but could also be one single, unitary piece having both front longitudinal lugs 130 and front lateral lugs 135, as shown in FIGS. 11-12. Rear terminal fitting 115 includes a pair of opposing rear longitudinal lugs 140 extending parallel to longitudinal axis A and a pair of rear lateral lugs 145 extending perpendicular to longitudinal axis A and positioned between the pair of rear longitudinal lugs 140. As shown, rear terminal fitting 115 is a single unitary piece having both rear longitudinal lugs 140 and both rear lateral lugs 145, but could also be two pieces, each having one rear longitudinal lug 140 and one rear lateral lug 145. First side chord 120 has at least one first middle longitudinal lug 150 extending parallel to longitudinal axis A and second side chord 125 has at least one second middle longitudinal lug 155, opposite first longitudinal lug 150. As shown, first side chord 120 has two first middle longitudinal lugs 150 and second side chord 125 has two second longitudinal lugs 155, however, first and second side chords 120, 125 can have any number of longitudinal lugs desired for a particular application. In addition, in the particular example shown, there are no lateral lugs positioned between first middle longitudinal lugs 150 and second longitudinal lugs 155. Therefore, in the example shown in FIGS. 4-10, base rib assembly 100 has a pair of opposing front longitudinal lugs 130, a pair of opposing rear longitudinal lugs 140, at least one pair of opposing middle longitudinal lugs 150, 155 disposed between front longitudinal lugs 130 and rear longitudinal lugs 140, a pair of front lateral lugs 135 disposed between front longitudinal lugs 130, and a pair of rear lateral lugs 145 disposed between rear longitudinal lugs 140.

Figure 6:
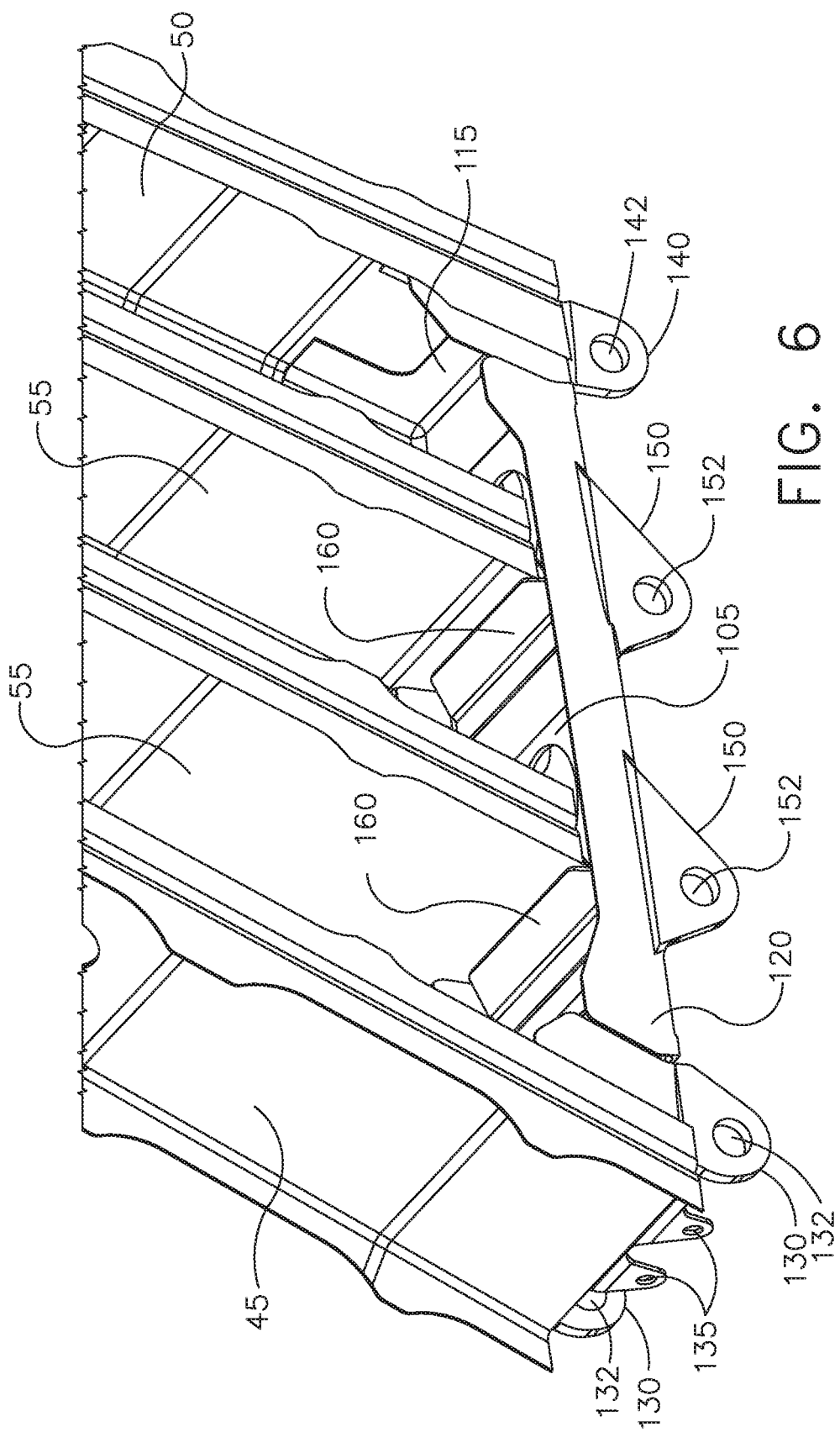
FIG. 6 is a front perspective view of the base rib assembly of FIG. 4 positioned within the multi-spar box of FIG. 2 with a side skin removed.
Figure 7:
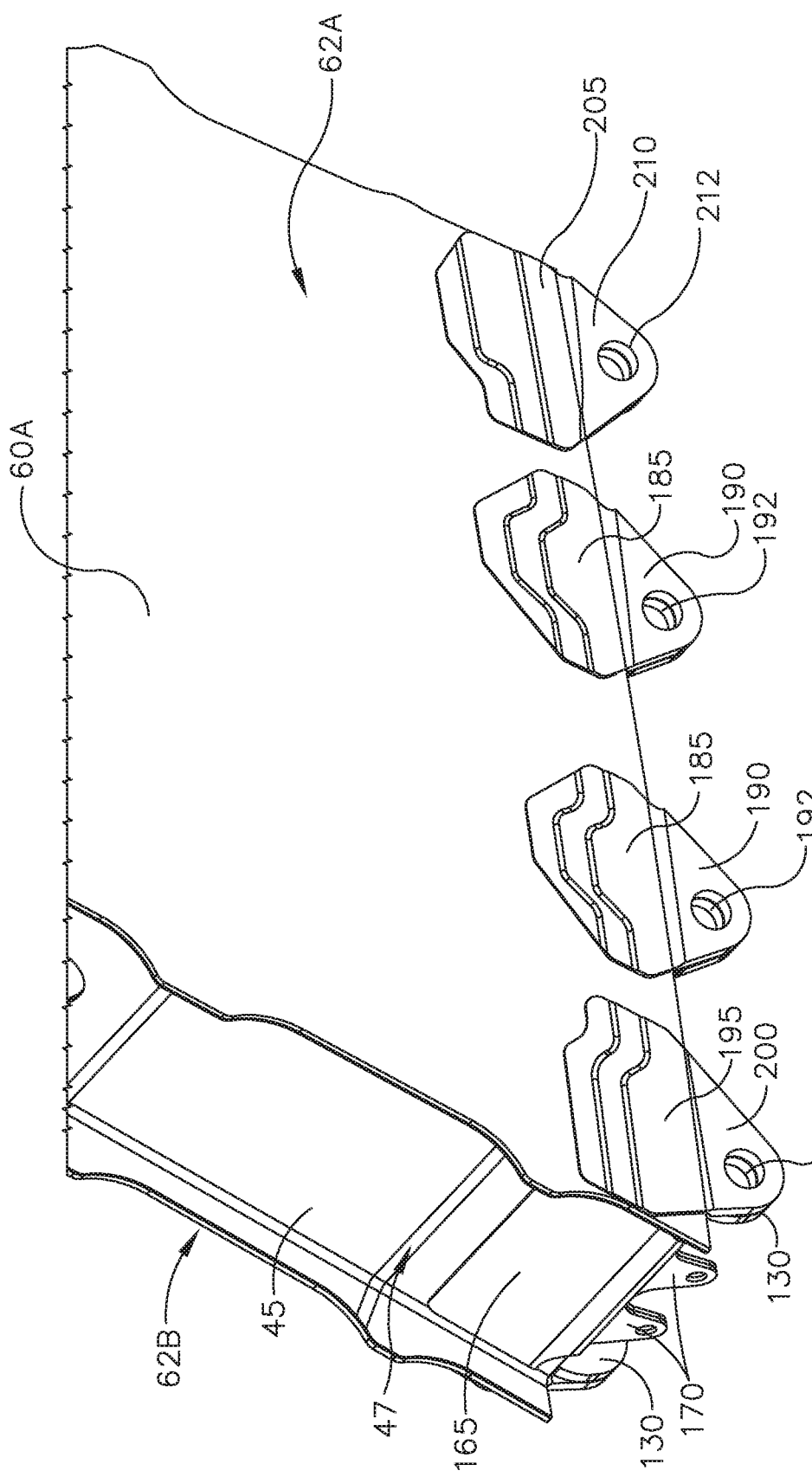
FIG. 7 is a front perspective view of the base rib assembly of FIG. 4 fully assembled with the multi-spar box of FIG. 2.

As seen in FIGS. 6-7, base rib assembly 100 is positioned in interior 65 of multi-spar box 40 and secured to multi-spar box 40. For example, front terminal fitting 110 of base rib assembly 100 can be secured to front spar 45 of multi-spar box 40 with screws, bolts, welding, or any other well-known securement method. Similarly, rear terminal fitting 115 can be secured to rear spar 50 with screws, bolts, welding, or any other well-known securement method. In addition, mid spars 55 can be secured to base rib assembly 100 by attaching L-shaped shear clips 160 between base rib 105 and/or first and second side chords 120, 125 of base rib assembly 100 and mid spars 55 with screws, bolts, welding, or any other well-known securement method.

Referring to FIG. 7, with base rib assembly 100 positioned in multi-spar box 40, a front plate 165 is positioned adjacent exterior surface 47, or adjacent an interior surface, of front spar 45 and is secured to front spar 45 and base rib assembly 100, for example, by screws that are threaded through front plate 165, front spar 45, and front terminal fitting 110 of base rib assembly 100. Alternatively, front plate 165 can be secured to front spar 45 and base rib assembly 100 by bolts, welding, or any other well-known securement method. Front plate 165 includes lateral lugs 170 that correspond to each of the front lateral lugs 135 of front terminal fitting 110 and that are adjacent to and aligned with corresponding front lateral lugs 135. As shown, front plate 165 is a single, unitary piece including both lateral lugs 170, but could also be two or more pieces, each having a single lateral lug 170 that corresponds to a front lateral lug 135. Similarly, a rear plate 175 is positioned adjacent exterior surface 52, or adjacent an interior surface, of rear spar 50, opposite front plate 165, and is secured to rear spar 50 and base rib assembly 100, for example, by screws that are threaded through rear plate 175, rear spar 50, and rear terminal fitting 115 of base rib assembly 100. Alternatively, rear plate 175 can be secured to rear spar 50 and base rib assembly 100 by bolts, welding, or any other well-known securement method. Rear plate 175 includes lateral lugs 180 that correspond to each of the rear lateral lugs 145 of rear terminal fitting 115 and that are adjacent to and aligned with corresponding rear lateral lugs 145. As shown, rear plate 175 is a single, unitary piece including both lateral lugs 180, but could also be two or more pieces, each having a single lateral lug 180 that corresponds to a rear lateral lug 145.

First side plates 185 are positioned adjacent exterior surface 62A of first side skin 60A and are secured to first side skin 60A and base rib assembly 100, for example, by screws that are threaded through first side plates 185, first side skin 60A, and first side chord 120. Alternatively, first side plates 185 could be secured to first side skin 60A and base rib assembly 100 by bolts, welding, or any other well-known securement method. Each first side plate 185 includes a longitudinal lug 190 that is adjacent to and aligned with a corresponding first middle longitudinal lug 150. In the example shown, there are two first side plates 185 since there are two first middle longitudinal lugs 150. However, there could be any number of first side plates 185 as required for the number of first middle longitudinal lugs 150. In addition, rather than individual first side plates 185, a single, unitary piece first side plate could be used that has multiple longitudinal lugs that each correspond to a first middle longitudinal lug. Corresponding second side plates (not shown) are also positioned adjacent exterior surface 62B of second side skin 60B, opposite corresponding first side plates 185, and are secured to second side skin 60B and base rib assembly 100, for example, by screws that are threaded through the second side plates, second side skin 60B, and second side chord 125. Alternatively, second side plates can be secured to second side skin 60B and base rib assembly 100 by bolts, welding, or any other well-known securement method. Each second side plate includes a longitudinal lug that is adjacent to and aligned with a corresponding second middle longitudinal lug 155. As with first side plates 185, there could be any number of second side plates as required for the number of second middle longitudinal lugs 155 or, rather than individual second side plates, a single, unitary piece second side plate could be used that has multiple longitudinal lugs that each correspond to a second middle longitudinal lug 155.

Third side plate 195 is positioned adjacent exterior surface 62A of first side skin 60A and is secured to first side skin 60A and base rib assembly 100, for example, by screws that are threaded through third side plate 195, first side skin 60A, and front terminal fitting 110. Alternatively, third side plates 195 can be secured to first side skin 60A and base rib assembly 100 by bolts, welding, or any other well-known securement method. Third side plate 195 includes a longitudinal lug 200 that is adjacent to and aligned with a corresponding front longitudinal lug 130. Corresponding fourth side plate (not shown) is also positioned adjacent exterior surface 62B of second side skin 60B, opposite corresponding third side plate 195, and is secured to second side skin 60B and base rib assembly 100, for example, by screws that are threaded through the fourth side plate, second side skin 60B, and front terminal fitting 110. Alternatively, fourth side plates can be secured to second side skin 60B and base rib assembly 100 by bolts, welding, or any other well-known securement method. Fourth side plate includes a longitudinal lug that is adjacent to and aligned with a corresponding front longitudinal lug 130.

Fifth side plate 205 is positioned adjacent exterior surface 62A of first side skin 60A and is secured to first side skin 60A and base rib assembly 100, for example, by screws that are threaded through fifth side plate 205, first side skin 60A, and rear terminal fitting 115. Alternatively, fifth side plates 205 can be secured to first side skin 60A and base rib assembly 100 by bolts, welding, or any other well-known securement method. Fifth side plate 205 includes a longitudinal lug 210 that is adjacent to and aligned with a corresponding rear longitudinal lug 140. Corresponding sixth side plate (not shown) is also positioned adjacent exterior surface 62B of second side skin 60B, opposite corresponding fifth side plates 205, and is secured to second side skin 60B and base rib assembly 100, for example, by screws that are threaded through the sixth side plate, second side skin 60B, and rear terminal fitting 115. Alternatively, sixth side plates can be secured to second side skin 60B and base rib assembly 100 by bolts, welding, or any other well-known securement method. Sixth side plate includes a longitudinal lug that is adjacent to and aligned with a corresponding rear longitudinal lug 140.

Figure 8:
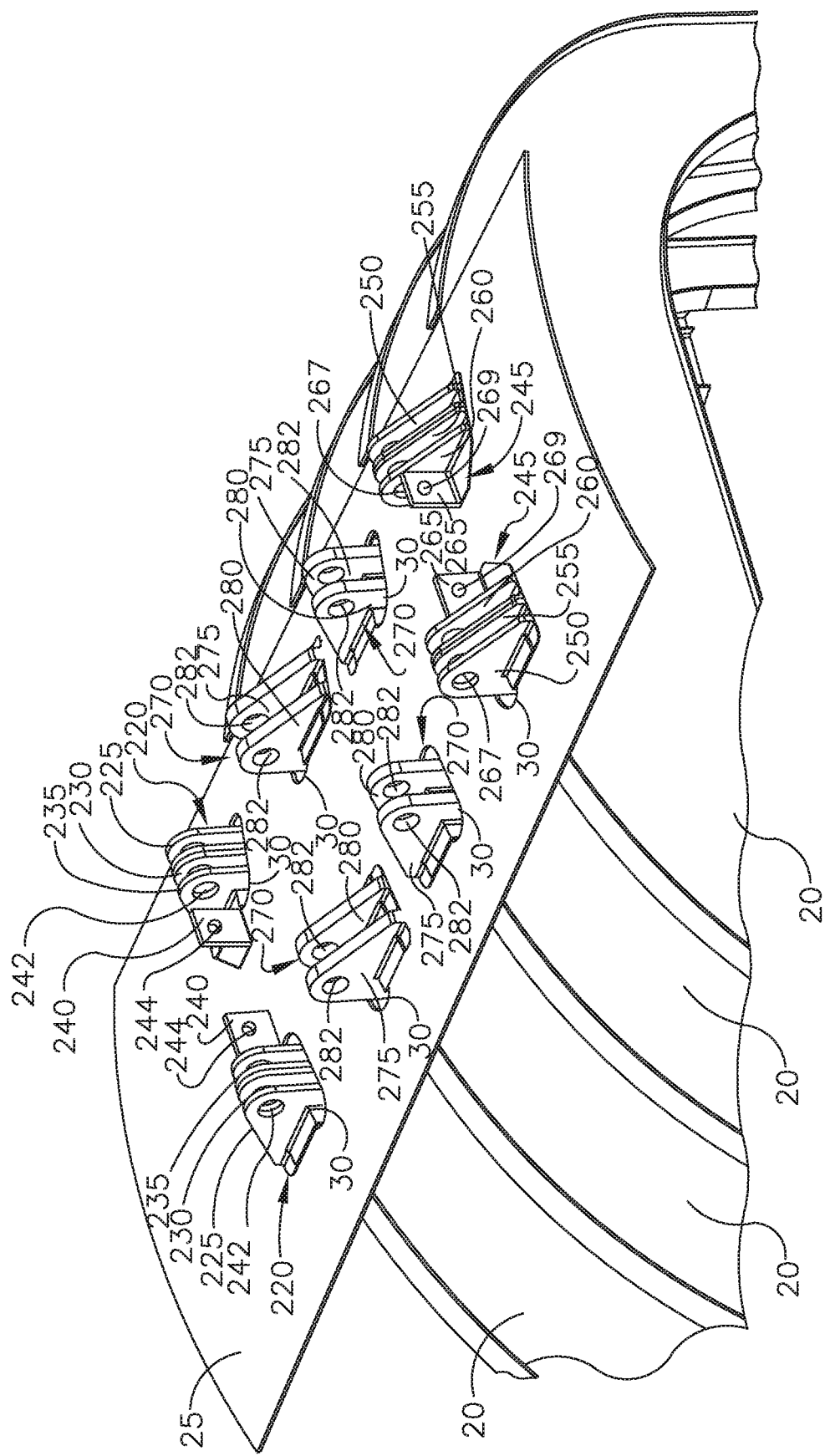
FIG. 8 is a partial illustration of a portion of the fuselage of the aircraft of FIG. 1 with a first set of exemplary clevises.

Referring to FIG. 8, a pair of front clevises 220 correspond to the pair of front longitudinal lugs 130 and each front clevis 220 extends through a corresponding aperture 30 in outer skin 25 and is secured to a frame member 20 of aircraft fuselage 15. In the example shown, front clevises 220 each have first, second, and third mounting arms 225, 230, 235 and a lateral wall 240 that extends inward, generally perpendicular to third mounting arm 235. Similarly, a pair of rear clevises 245 correspond to the pair of rear longitudinal lugs 140 and each rear clevis 245 extends through a corresponding aperture 30 in outer skin 25 and is secured to a frame member 20 of aircraft fuselage. In the example shown, rear devises 245 each have first, second, and third mounting arms 250, 255, 260 and a lateral wall 240 that extends inward, generally perpendicular to third mounting arm 260. Pairs of middle clevises 270 correspond to the pairs of middle longitudinal lugs 150, 155 and each middle clevis 270 extends through a corresponding aperture 30 in outer skin 25 and is secured to a frame member 20 of aircraft fuselage 15. Middle clevises 270 each have only first and second mounting arms 275, 280.

Figure 9:
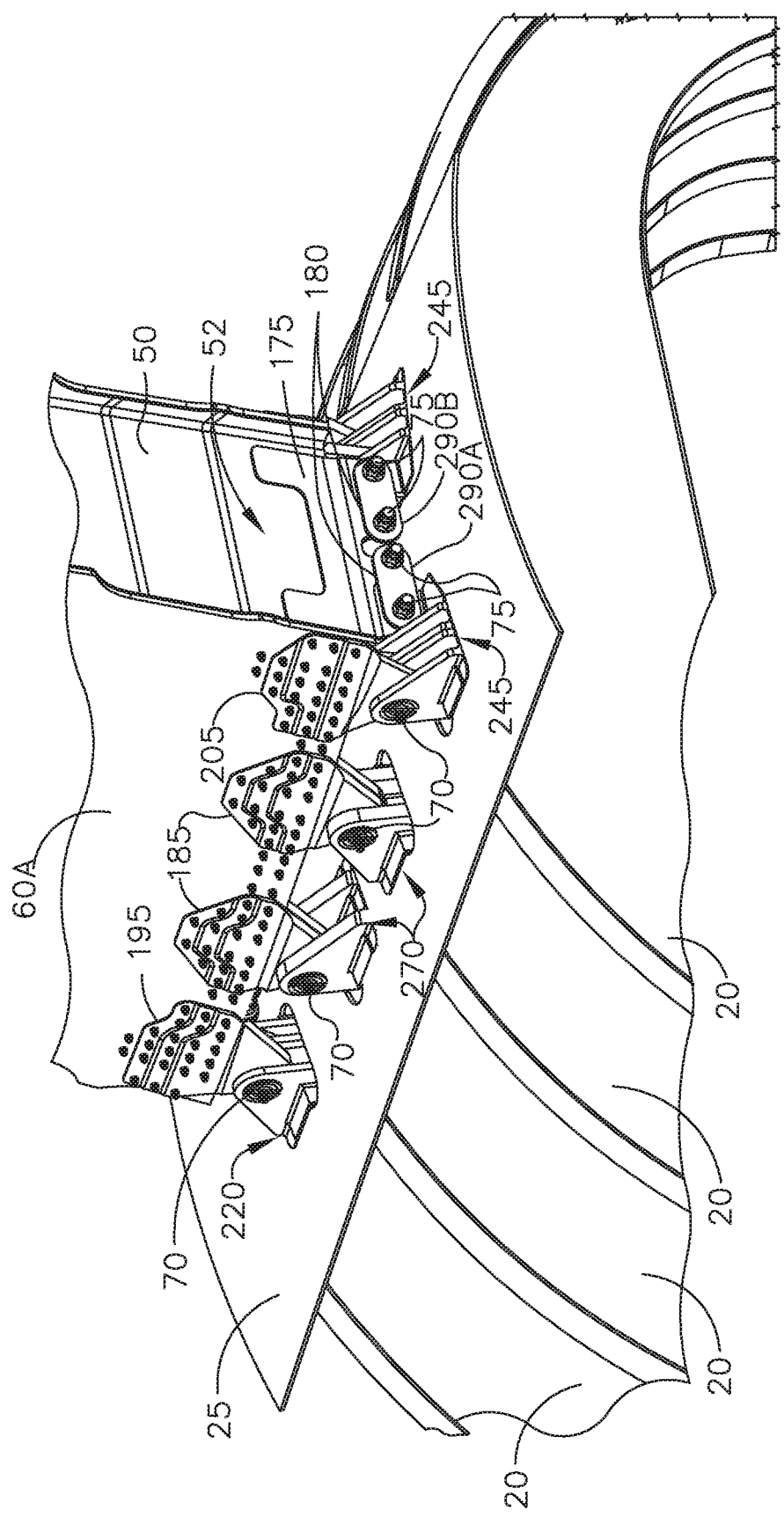
FIG. 9 is rear perspective view of the multi-spar box and base rib assembly of FIG. 7 connected to the fuselage of FIG. 8.
Figure 10:
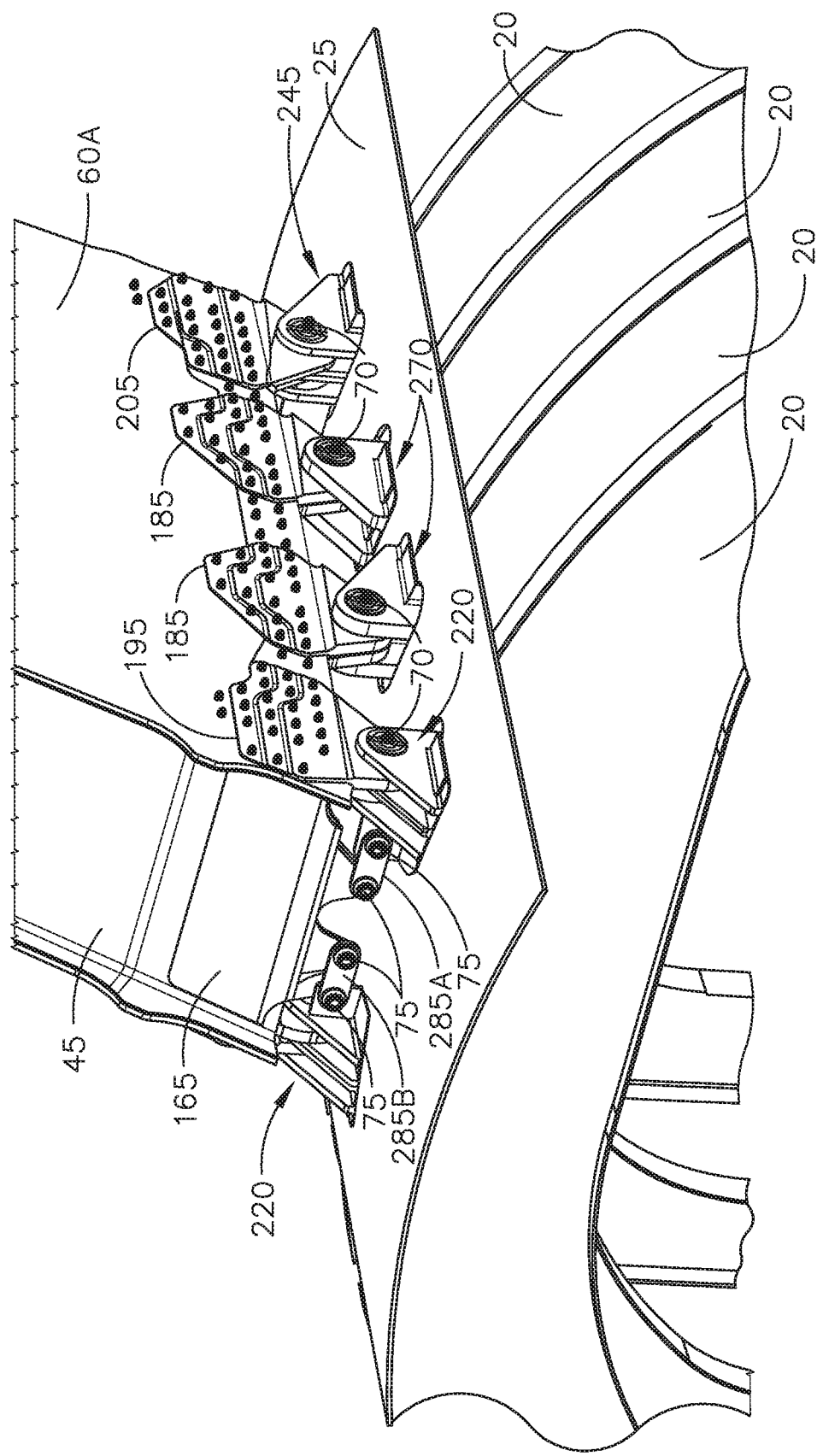
FIG. 10 is a front perspective view of the multi-spar box, base rib assembly, and fuselage of FIG. 9.

Referring to FIGS. 9-10, longitudinal lugs 190 of first side plates 185 and corresponding first middle longitudinal lugs 150 of base rib assembly 100 are positioned between first mounting arm 275 and second mounting arm 280 of the corresponding middle clevis 270 and longitudinal lugs of second side plates (now shown) and corresponding second middle longitudinal lugs 155 of base rib assembly 100 are positioned between first mounting arm 275 and second mounting arm 280 of the corresponding middle clevis 270. Retaining members 70, such as bolts, pins, etc., are inserted through mounting holes 152, 157 in each middle longitudinal lug 150, 155, mounting holes 192 in first side plate 185 and second side plate, and mounting holes 282 in each mounting arm 275, 280 of each corresponding middle clevis 270 to secure vertical stabilizer 35 to aircraft fuselage 15.

In addition, longitudinal lug 200 of third side plate 195 is positioned between first mounting arm 225 and second mounting arm 230 of the corresponding front clevis 220 and the corresponding front longitudinal lug 130 of base rib assembly 100 is positioned between second mounting arm 230 and third mounting arm 235 of the corresponding front clevis 220. The longitudinal lug of the fourth side plate is similarly positioned between first mounting arm 225 and second mounting arm 230 of the corresponding front clevis 220 on the opposite side and the corresponding front longitudinal lug 130 of base rib assembly 100 is positioned between second mounting arm 230 and third mounting arm 235 of the corresponding front clevis 220. Retaining members 70, such as bolts, pins, etc., are inserted through mounting holes 132 in each front longitudinal lug 130, mounting holes 202 in third side plate 195 and fourth side plate, and mounting holes 242 in each mounting arm 225, 230, 235 of each corresponding front clevis 220 to secure vertical stabilizer 35 to aircraft fuselage 15.

Similarly, longitudinal lug 210 of fifth side plate 205 is positioned between first mounting arm 250 and second mounting arm 255 of the corresponding rear clevis 245 and the corresponding rear longitudinal lug 140 of base rib assembly 100 is positioned between second mounting arm 255 and third mounting arm 260 of the corresponding rear clevis 245. The longitudinal lug of the sixth side plate is similarly positioned between first mounting arm 250 and second mounting arm 255 of the corresponding rear clevis 245 on the opposite side and the corresponding rear longitudinal lug 140 of base rib assembly 100 is positioned between second mounting arm 255 and third mounting arm 260 of the corresponding rear clevis 245. Retaining members 70 such as bolts, pins, etc., are inserted through mounting holes 142 in each rear longitudinal lug 140, mounting holes 212 in fifth side plate 205 and sixth side plate, and mounting holes 267 in each mounting arm 250, 255, 260 of each corresponding rear clevis 245 to secure vertical stabilizer 35 to aircraft fuselage 15.

To provide lateral support for vertical stabilizer 35, first and second front links 285A, B interconnect each of the pair of front lateral lugs 135 of front terminal fitting 110 and a corresponding lateral wall 240 of one of the pair of front clevises 220 via retaining members 75, such as bolts, pins, etc., that extend through mounting holes 137 in front lateral lugs 135 and mounting holes 244 in lateral walls 240 of front clevises 220. Similarly, first and second rear links 290A, B interconnect each of the pair of rear lateral lugs 145 of rear terminal fitting 115 and a corresponding lateral wall 265 of one of the pair of rear clevises 245 via retaining members 75, such as bolts, pins, etc., that extend through mounting holes 147 in rear lateral lugs 145 and mounting holes 269 in lateral walls 265 of rear clevises 245.

To attach vertical stabilizer 35 to aircraft fuselage 15 as discussed above, base rib assembly 100 is first assembled, which, as discussed above, has a pair of opposing front longitudinal lugs 130, a pair of opposing rear longitudinal lugs 140, at least one pair of opposing middle longitudinal lugs 150, 155 between front longitudinal lugs 130 and rear longitudinal lugs 140, and pairs of front and rear lateral lugs 135, 145, each of which have a corresponding mounting hole 132, 142, 152, 157, 137, 147. To assemble base rib assembly 100, first side chord 120 is attached to base rib 105, second side chord 125 is attached to base rib 105, opposite first side chord 120, front terminal fitting 110 is attached to base rib 105, and rear terminal fitting 115 is attached to base rib 105, opposite front terminal fitting 110. Base rib assembly 100 is then inserted into interior 65 of multi-spar box 40 of vertical stabilizer 35 and L-shaped shear clips 160 are attached between mid spars 55 and base rib assembly 100.

Front plate 165 is then positioned adjacent exterior surface 47, or adjacent an interior surface, of front spar 45 and is secured to front spar 45 and base rib assembly 100, rear plate 175 is positioned adjacent exterior surface 52, or adjacent an interior surface, of rear spar 50, opposite front plate 165, and is secured to rear spar 50 and base rib assembly 100, first side plate 185 is positioned adjacent exterior surface 62A of first side skin 60A of multi-spar box 40 and is secured to first side skin 60A and base rib assembly 100, and the second side plate is positioned adjacent exterior surface 62B of second side skin 60B of multi-spar box 40 and is secured to second side skin 60B and base rib assembly 100.

Front clevises 220, rear clevises 245, and middle clevises 270 are inserted through corresponding apertures 30 in outer skin 25 of aircraft fuselage 15 and are secured to corresponding frame members 20 of aircraft fuselage, for example, with bolts, screws, rivets, welding, etc. Front clevises 220 correspond to front longitudinal lugs 130 and each have first, second, and third mounting arms 225, 230, 235 with mounting holes 242 and rear clevises 245 correspond to rear longitudinal lugs 140 and each have first, second, and third mounting arms 250, 255, 260 with mounting holes 267. Middle clevises 270 correspond to middle longitudinal lugs 150, 155 and each have only first and second mounting arms 275, 280 with mounting holes 282.

Vertical stabilizer 35 is then positioned adjacent aircraft fuselage 15 such that each front, rear, and middle longitudinal lug 130, 140, 150, 155 is aligned with a corresponding front, rear, or middle clevis 220, 245, 270 and retaining members 70 are inserted through mounting holes 132, 142, 152, 157 of each longitudinal lug 130, 140, 150, 155 and mounting holes 242, 267, 282 of each corresponding clevis 220, 245, 270 to secure vertical stabilizer 35 to aircraft fuselage 15. Each front lateral lug 135 is attached to a first end of a corresponding front link 285A, 285B with retaining members 75 and a second end of front links 285A, 285B is attached to corresponding lateral clevises, which in the example shown are lateral walls 240 of front clevises 220. Similarly, each rear lateral lug 145 is attached to a first end of a corresponding rear link 290A, 290B with retaining members 75 and a second end of rear links 490A, 490B is attached to corresponding lateral devises, which in the example shown are lateral walls 265 of rear clevises 245.

Referring to FIGS. 11-17, a second example connection between aircraft fuselage 15 and multi-spar box 40 of vertical stabilizer 35 is shown. As best seen in FIGS. 11-12, a base rib assembly 300 has a base rib 305 and a front terminal fitting 310, rear terminal fitting 315 opposite front terminal fitting 310, first side chord 320, and second side chord 325 opposite first side chord 320, attached to base rib 305. Front terminal fitting 310 includes a pair of opposing front longitudinal lugs 330 extending parallel to a longitudinal axis A of base rib assembly 300 and a pair of front lateral lugs 335 extending perpendicular to longitudinal axis A and positioned between the pair of front longitudinal lugs 330. As shown, front terminal fitting 310 is a single, unitary piece having both front longitudinal lugs 330 and front lateral lugs 335, but could also be two pieces, each having one front longitudinal lug 330 and one front lateral lug 335, as shown in FIGS. 4-5. Rear terminal fitting 315 includes a pair of opposing rear longitudinal lugs 340 extending parallel to longitudinal axis A and a pair of rear lateral lugs 345 extending perpendicular to longitudinal axis A and positioned between the pair of rear longitudinal lugs 340. As shown, rear terminal fitting 315 is a single unitary piece having both rear longitudinal lugs 340 and both rear lateral lugs 345, but could also be two pieces, each having one rear longitudinal lug 340 and one rear lateral lug 345. First side chord 320 has at least one first middle longitudinal lug 350 extending parallel to longitudinal axis A and second side chord 325 has at least one second middle longitudinal lug 355, opposite first longitudinal lug 350. As shown, first side chord 320 has two first longitudinal lugs 350 and second side chord 325 has two second longitudinal lugs 355, however, first and second side chords 320, 325 can have any number of longitudinal lugs desired for a particular application. In addition, in the particular example shown, there are no lateral lugs positioned between first longitudinal lugs 350 and second longitudinal lugs 355. Therefore, in the example shown in FIGS. 11-17, base rib assembly 300 has a pair of opposing front longitudinal lugs 330, a pair of opposing rear longitudinal lugs 340, at least one pair of opposing middle longitudinal lugs 350, 355 disposed between front longitudinal lugs 330 and rear longitudinal lugs 340, a pair of front lateral lugs 335 disposed between front longitudinal lugs 330, and a pair of rear lateral lugs 345 disposed between rear longitudinal lugs 340.

Figure 13:
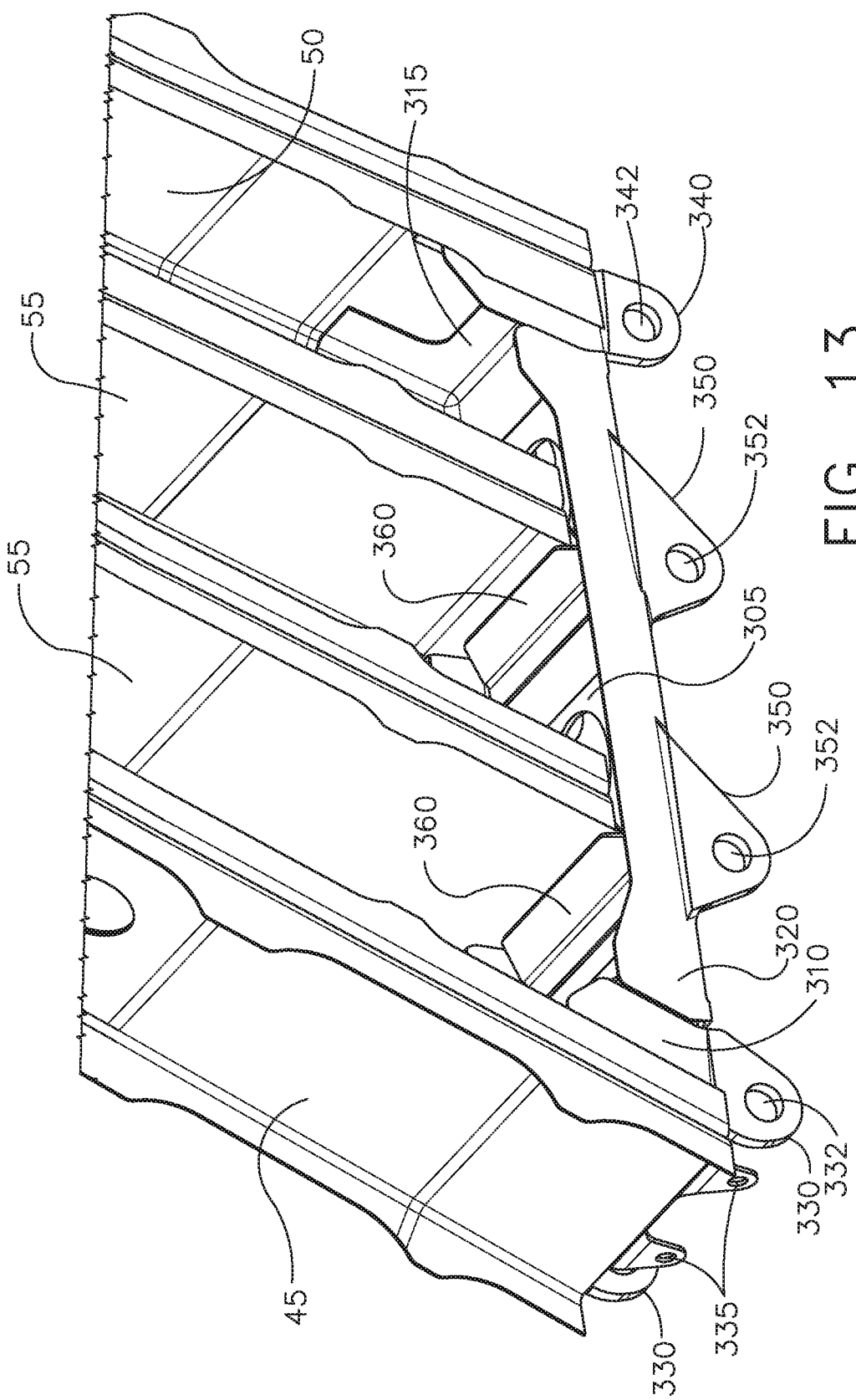
FIG. 13 is a front perspective view of the base rib assembly of FIG. 11 positioned within the multi-spar box of FIG. 2 with a side skin removed.
Figure 14:
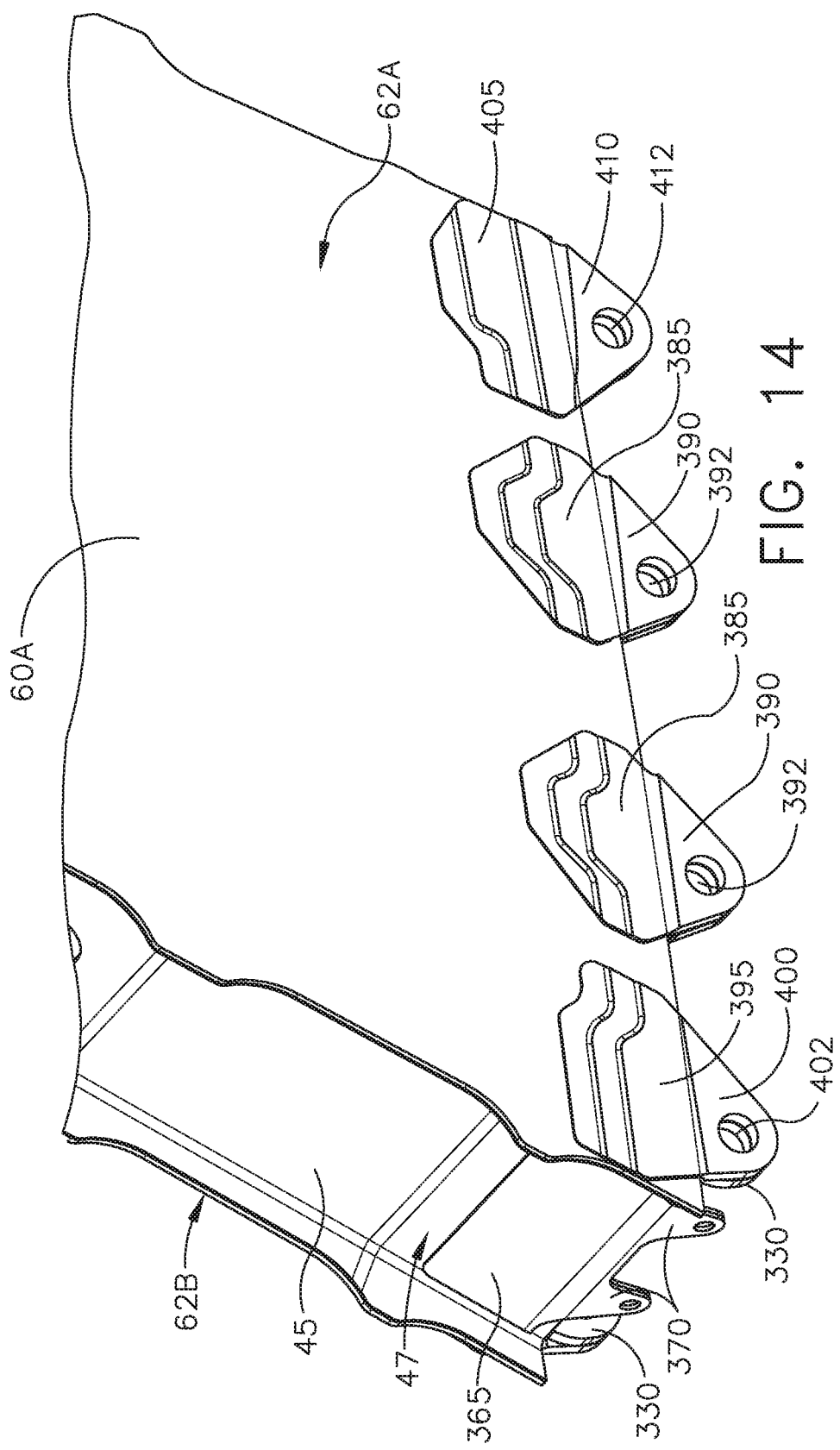
FIG. 14 is a front perspective view of the base rib assembly of FIG. 11 fully assembled with the multi-spar box of FIG. 2.

As seen in FIGS. 13-14, base rib assembly 300 is positioned in interior 65 of multi-spar box 40 and secured to multi-spar box 40. For example, front terminal fitting 310 of base rib assembly 300 can be secured to front spar 45 of multi-spar box 40 with screws, bolts, welding, or any other well-known securement method. Similarly, rear terminal fitting 315 can be secured to rear spar 50 with screws, bolts, welding, or any other well-known securement method. In addition, mid spars 55 can be secured to base rib assembly 300 by attaching L-shaped shear clips 360 between base rib 305 and/or first and second side chords 320, 325 of base rib assembly 300 and mid spars 55 with screws, bolts, welding, or any other well-known securement method.

Referring to FIG. 14, with base rib assembly 300 positioned in multi-spar box 40, a front plate 365 is positioned adjacent exterior surface 47, or adjacent an interior surface, of front spar 45 and is secured to front spar 45 and base rib assembly 300, for example, by screws that are threaded through front plate 365, front spar 45, and front terminal fitting 310 of base rib assembly 300. Alternatively, front plates 365 can be secured to second front spar 45 and base rib assembly 300 by bolts, welding, or any other well-known securement method. Front plate 365 includes lateral lugs 370 that correspond to each of the front lateral lugs 335 of front terminal fitting 310 and that are adjacent to and aligned with corresponding front lateral lugs 335. As shown, front plate 365 is a single, unitary piece including both lateral lugs 370, but could also be two or more pieces, each having a single lateral lug 370 that corresponds to a front lateral lug 335. Similarly, a rear plate 375 is positioned adjacent exterior surface 52, or adjacent an interior surface, of rear spar 50, opposite front plate 365, and is secured to rear spar 50 and base rib assembly 300, for example, by screws that are threaded through rear plate 375, rear spar 50, and rear terminal fitting 315 of base rib assembly 300. Alternatively, rear plate 375 can be secured to rear spar 50 and base rib assembly 300 by bolts, welding, or any other well-known securement method. Rear plate 375 includes lateral lugs 380 that correspond to each of the rear lateral lugs 345 of rear terminal fitting 315 and that are adjacent to and aligned with corresponding rear lateral lugs 345. As shown, rear plate 375 is a single, unitary piece including both lateral lugs 380, but could also be two or more pieces, each having a single lateral lug 380 that corresponds to a rear lateral lug 345.

First side plates 385 are positioned adjacent exterior surface 62A of first side skin 60A and are secured to first side skin 60A and base rib assembly 300, for example, by screws that are threaded through first side plates 385, first side skin 60A, and first side chord 320. Alternatively, first side plates 385 can be secured to first side skin 60A and base rib assembly 300 by bolts, welding, or any other well-known securement method. Each first side plate 385 includes a longitudinal lug 390 that is adjacent to and aligned with a corresponding first middle longitudinal lug 350. In the example shown, there are two first side plates 385 since there are two first middle longitudinal lugs 350. However, there could be any number of first side plates 385 as required for the number of first middle longitudinal lugs 350. In addition, rather than individual first side plates 385, a single, unitary piece first side plate could be used that has multiple longitudinal lugs that each correspond to a first middle longitudinal lug. Corresponding second side plates (not shown) are also positioned adjacent exterior surface 62B of second side skin 60B, opposite corresponding first side plates 385, and are secured to second side skin 60B and base rib assembly 300, for example, by screws that are threaded through the second side plates, second side skin 60B, and second side chord 325. Alternatively, second side plates can be secured to second side skin 60B and base rib assembly 300 by bolts, welding, or any other well-known securement method. Each second side plate includes a longitudinal lug that is adjacent to and aligned with a corresponding second middle longitudinal lug 355. As with first side plates 385, there could be any number of second side plates as required for the number of second middle longitudinal lugs 355 or, rather than individual second side plates, a single, unitary piece second side plate could be used that has multiple longitudinal lugs that each correspond to a second middle longitudinal lug 355.

Third side plate 395 is positioned adjacent exterior surface 62A of first side skin 60A and is secured to first side skin 60A and base rib assembly 300, for example, by screws that are threaded through third side plate 395, first side skin 60A, and front terminal fitting 310. Alternatively, third side plates 395 can be secured to first side skin 60A and base rib assembly 300 by bolts, welding, or any other well-known securement method. Third side plate 395 includes a longitudinal lug 400 that is adjacent to and aligned with a corresponding front longitudinal lug 330. Corresponding fourth side plate (not shown) is also positioned adjacent exterior surface 62B of second side skin 60B, opposite corresponding third side plate 395, and is secured to second side skin 60B and base rib assembly 300, for example, by screws that are threaded through the fourth side plate, second side skin 60B, and front terminal fitting 310. Alternatively, sourth side plates can be secured to second side skin 60B and base rib assembly 300 by bolts, welding, or any other well-known securement method. Fourth side plate includes a longitudinal lug that is adjacent to and aligned with a corresponding front longitudinal lug 330.

Fifth side plate 405 is positioned adjacent exterior surface 62A of first side skin 60A and is secured to first side skin 60A and base rib assembly 300, for example, by screws that are threaded through fifth side plate 405, first side skin 60A, and rear terminal fitting 315. Alternatively, fifth side plates 405 can be secured to first side skin 60A and base rib assembly 300 by bolts, welding, or any other well-known securement method. Fifth side plate 405 includes a longitudinal lug 410 that is adjacent to and aligned with a corresponding rear longitudinal lug 340. Corresponding sixth side plate (not shown) is also positioned adjacent exterior surface 62B of second side skin 60B, opposite corresponding fifth side plates 405, and is secured to second side skin 60B and base rib assembly 300, for example, by screws that are threaded through the sixth side plate, second side skin 60B, and rear terminal fitting 315. Alternatively, sixth side plates can be secured to second side skin 60B and base rib assembly 300 by bolts, welding, or any other well-known securement method. Sixth side plate includes a longitudinal lug that is adjacent to and aligned with a corresponding rear longitudinal lug 340.

Figure 15:
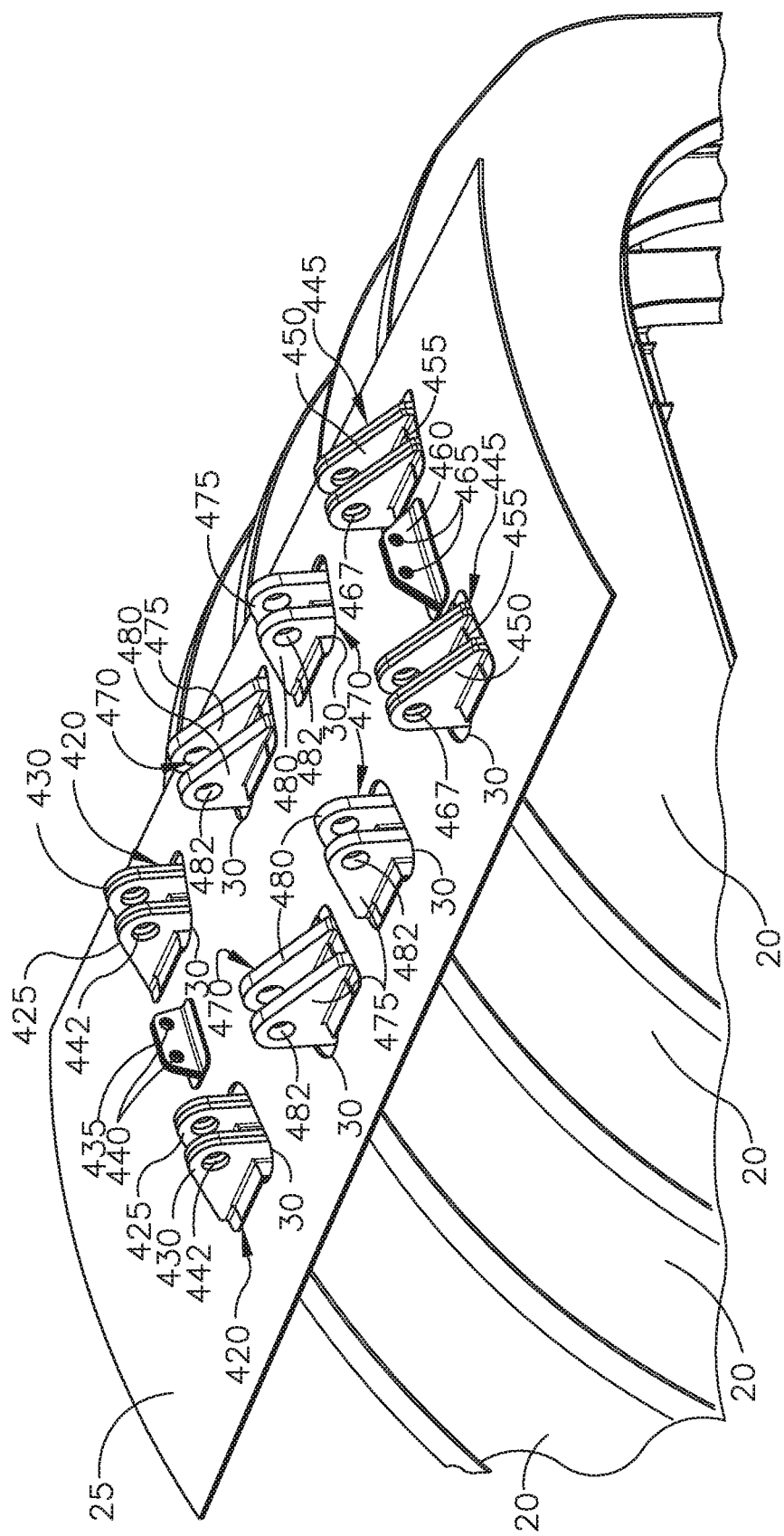
FIG. 15 is a partial illustration of a portion of the fuselage of the aircraft of FIG. 1 with a second set of exemplary clevises.

Referring to FIG. 15, a pair of front clevises 420 correspond to the pair of front longitudinal lugs 330 and each front clevis 420 extends through a corresponding aperture 30 in outer skin 25 and is secured to a frame member 20 of aircraft fuselage 15. In the example shown, front clevises 420 each have first and second mounting arms 425, 430. Similarly, a pair of rear clevises 445 correspond to the pair of rear longitudinal lugs 340 and each rear clevis 445 extends through a corresponding aperture 30 in outer skin 25 and is secured to a frame member 20 of aircraft fuselage 15. In the example shown, rear clevises 445 each have first and second mounting arms 450, 455. Pairs of middle clevises 470 correspond to the pairs of middle longitudinal lugs 350, 355 and each middle clevis 470 extends through a corresponding aperture 30 in outer skin 25 and is secured to a frame member 20 of aircraft fuselage 15. Middle clevises 470 each have first and second mounting arms 475, 480. A front lateral clevis 435 is positioned between the pair of front clevises 420 and extends through a corresponding aperture 30 in outer skin 25 and is secured to a frame member 20 of aircraft fuselage 15. A rear lateral clevis 460 is positioned between the pair of rear clevises 445 and extends through a corresponding aperture 30 in outer skin 25 and is secured to a frame member 20 of aircraft fuselage 15.

Figure 16:
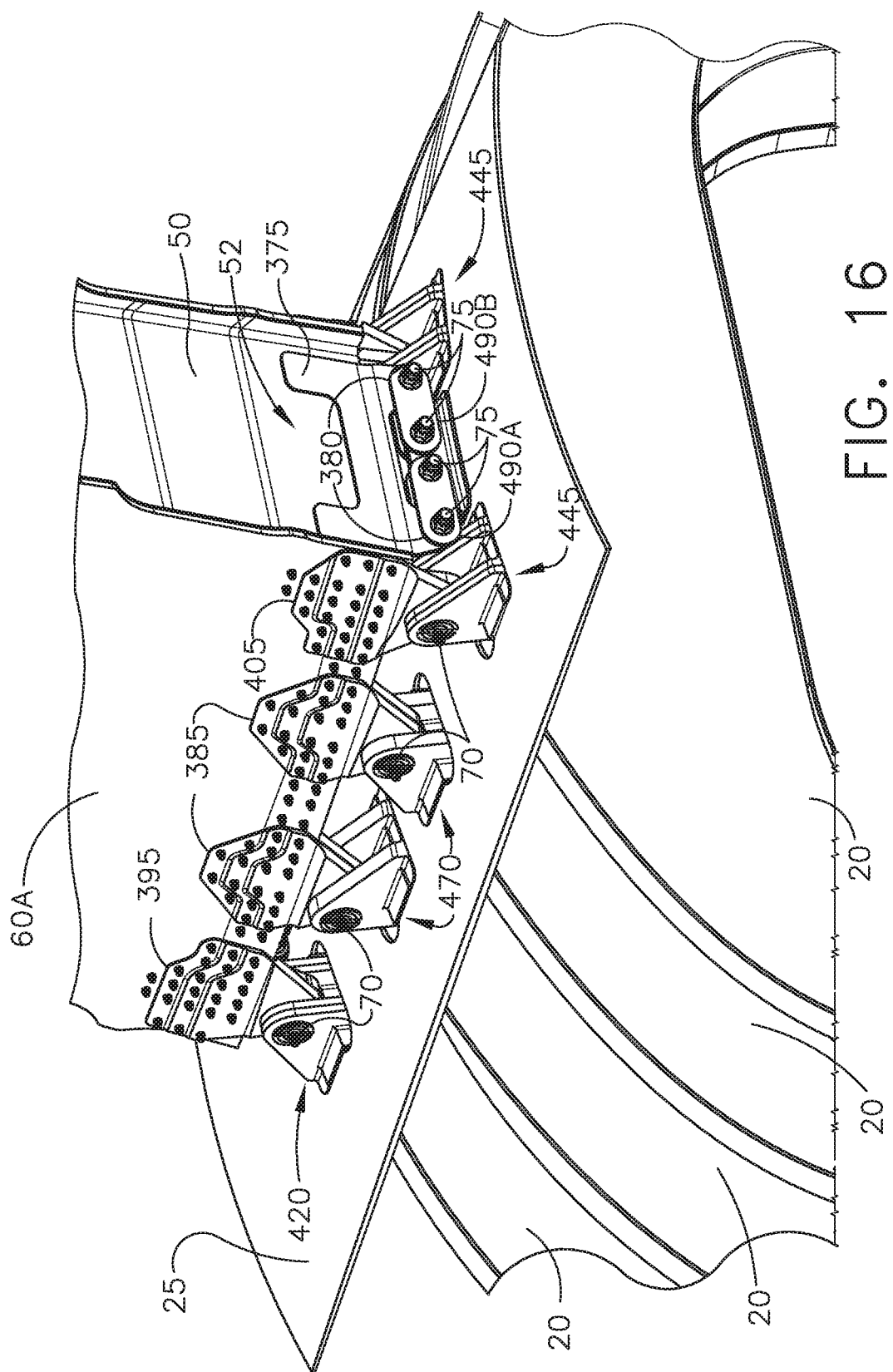
FIG. 16 is rear perspective view of the multi-spar box and base rib assembly of FIG. 14 connected to the fuselage of FIG. 15.
Figure 17:
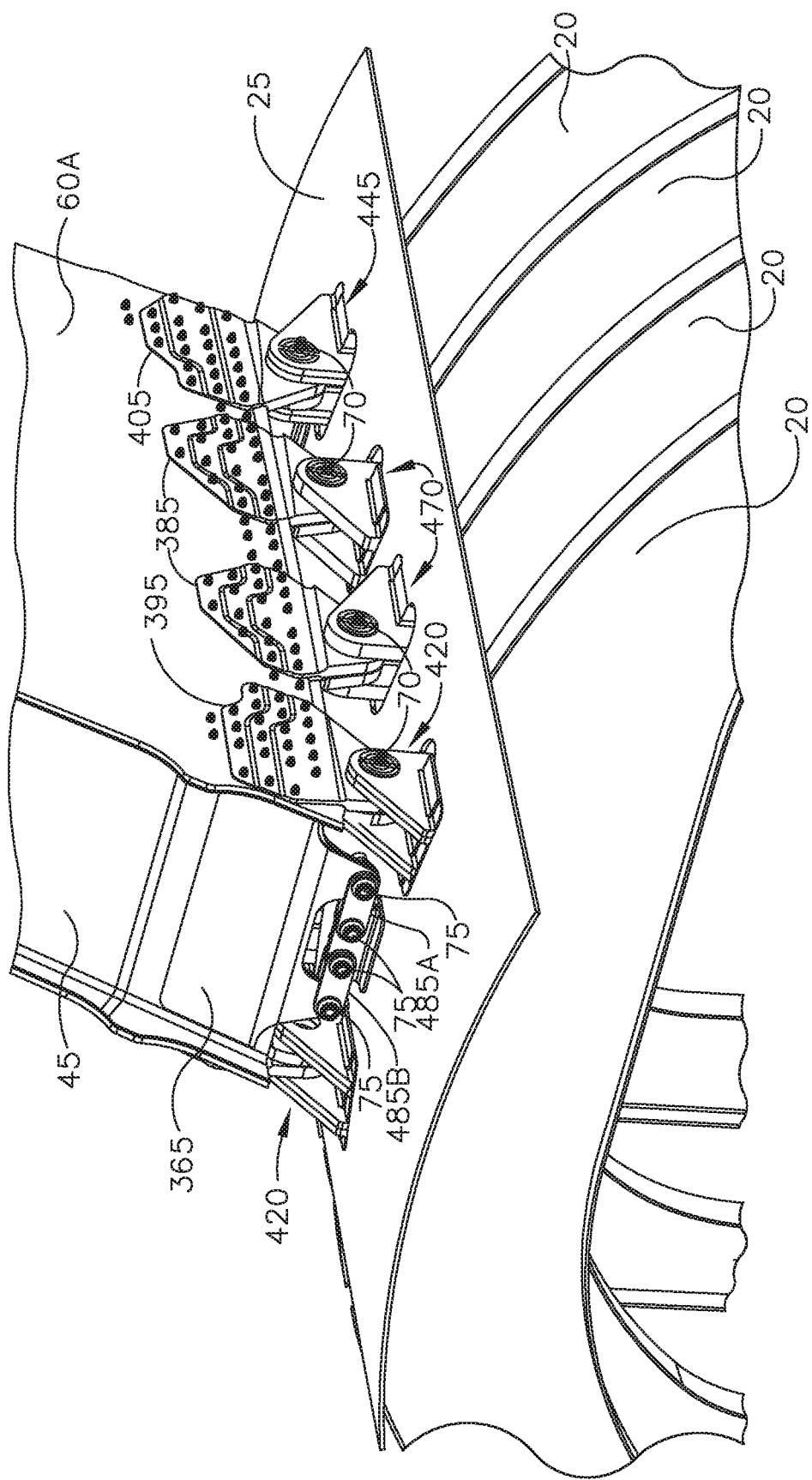
FIG. 17 is a front perspective view of the multi-spar box, base rib assembly, and fuselage of FIG. 16.

Referring to FIGS. 16-17, longitudinal lugs 390 of first side plates 385 and corresponding first middle longitudinal lugs 350 of base rib assembly 300 are positioned between first mounting arm 475 and second mounting arm 480 of the corresponding middle clevis 470 and longitudinal lugs of second side plates (now shown) and corresponding second middle longitudinal lugs 355 of base rib assembly 300 are positioned between first mounting arm 475 and second mounting arm 480 of the corresponding middle clevis 470. Retaining members 70, such as bolts, pins, etc., are inserted through mounting holes 352, 357 in each middle longitudinal lug 350, 355, mounting holes 392 in first side plate 385 and second side plate, and mounting holes 482 in each mounting arm 475, 480 of each corresponding middle clevis 470 to secure vertical stabilizer 35 to aircraft fuselage 15.

In addition, longitudinal lug 400 of third side plate 395 and corresponding front longitudinal lug 330 of base rib assembly 300 are positioned between first mounting arm 425 and second mounting arm 430 of the corresponding front clevis 420. The longitudinal lug of the fourth side plate and the corresponding front longitudinal lug 330 of base rib assembly 300 are similarly positioned between first mounting arm 425 and second mounting arm 430 of the corresponding front clevis 420. Retaining members 70, such as bolts, pins, etc., are inserted through mounting holes 332 in each front longitudinal lug 330, mounting holes 402 in third side plate 395 and fourth side plate, and mounting holes 442 in each mounting arm 425, 430 of each corresponding front clevis 420 to secure vertical stabilizer 35 to aircraft fuselage 15.

Similarly, longitudinal lug 410 of fifth side plate 405 and the corresponding rear longitudinal lug 340 of base rib assembly 300 are positioned between first mounting arm 450 and second mounting arm 455 of the corresponding rear clevis 445. The longitudinal lug of the sixth side plate and the corresponding rear longitudinal lug 340 of base rib assembly 300 are similarly positioned between first mounting arm 450 and second mounting arm 455 of the corresponding rear clevis 445. Retaining members 70 such as bolts, pins, etc., are inserted through mounting holes 342 in each rear longitudinal lug 340, mounting holes 412 in fifth side plate 405 and sixth side plate, and mounting holes 467 in each mounting arm 450, 455 of each corresponding rear clevis 445 to secure vertical stabilizer 35 to aircraft fuselage 15.

To provide lateral support for vertical stabilizer 35, first and second front links 485A, B interconnect each of the pair of front lateral lugs 335 of front terminal fitting 310 and front lateral clevis 435 via retaining members 75, such as bolts, pins, etc., that extend through mounting holes 337 in front lateral lugs 335 and mounting holes 440 in front lateral clevis 435. Similarly, first and second rear links 490A, B interconnect each of the pair of rear lateral lugs 345 of rear terminal fitting 315 and rear lateral clevis 460 via retaining members 75, such as bolts, pins, etc., that extend through mounting holes 347 in rear lateral lugs 345 and mounting holes 465 in rear lateral clevis 460.

To attach vertical stabilizer 35 to aircraft fuselage 15 as discussed above, base rib assembly 300 is first assembled, which, as discussed above, has a pair of opposing front longitudinal lugs 330, a pair of opposing rear longitudinal lugs 340, at least one pair of opposing middle longitudinal lugs 350, 355 between front longitudinal lugs 330 and rear longitudinal lugs 340, and pairs of front and rear lateral lugs 335, 345, each of which have a corresponding mounting hole 332, 342, 352, 357, 337, 347. To assemble base rib assembly 300, first side chord 320 is attached to base rib 305, second side chord 325 is attached to base rib 305, opposite first side chord 320, front terminal fitting 310 is attached to base rib 305, and rear terminal fitting 315 is attached to base rib 305, opposite front terminal fitting 310. Base rib assembly 300 is then inserted into interior 65 of multi-spar box 40 of vertical stabilizer 35 and L-shaped shear clips 360 are attached between mid spars 55 and base rib assembly 300.

Front plate 365 is then positioned adjacent exterior surface 47, or adjacent an interior surface, of front spar 45 and is secured to front spar 45 and base rib assembly 300, rear plate 375 is positioned adjacent exterior surface 52, or adjacent an interior surface, of rear spar 50, opposite front plate 365, and is secured to rear spar 50 and base rib assembly 300, first side plate 385 is positioned adjacent exterior surface 62A of first side skin 60A of multi-spar box 40 and is secured to first side skin 60A and base rib assembly 300, and the second side plate is positioned adjacent exterior surface 62B of second side skin 60B of multi-spar box 40 and is secured to second side skin 60B and base rib assembly 300.

Front clevises 420, rear clevises 445, and middle clevises 470 are inserted through corresponding apertures 30 in outer skin 25 of aircraft fuselage 15 and are secured to corresponding frame members 20 of aircraft fuselage 15, for example, with bolts, screws, rivets, welding, etc. Front clevises 420 correspond to front longitudinal lugs 330 and each have first and second mounting arms 425, 430 with mounting holes 442 and rear clevises 445 correspond to rear longitudinal lugs 340 and each have first and second mounting arms 450, 455 with mounting holes 467. Middle clevises 470 correspond to middle longitudinal lugs 350, 355 and each have first and second mounting arms 475, 480 with mounting holes 482.

Vertical stabilizer 35 is then positioned adjacent aircraft fuselage 15 such that each front, rear, and middle longitudinal lug 330, 340, 350, 355 is aligned with a corresponding front, rear, or middle clevis 420, 445, 470 and retaining members 70 are inserted through mounting holes 332, 342, 352, 357 of each longitudinal lug 330, 340, 350, 355 and mounting holes 442, 467, 482 of each corresponding clevis 420, 445, 470 to secure vertical stabilizer 35 to aircraft fuselage 15. Each front lateral lug 335 is attached to a first end of a corresponding front link 485A, 485B with retaining members 75 and a second end of front links 485A, 485B is attached to front lateral clevis 435 with retaining members 75. Similarly, each rear lateral lug 345 is attached to a first end of a corresponding rear link 490A, 490B with retaining members 75 and a second end of rear links 490A, 490B is attached to rear lateral clevis 460 with retaining members 75.

Figure 18:
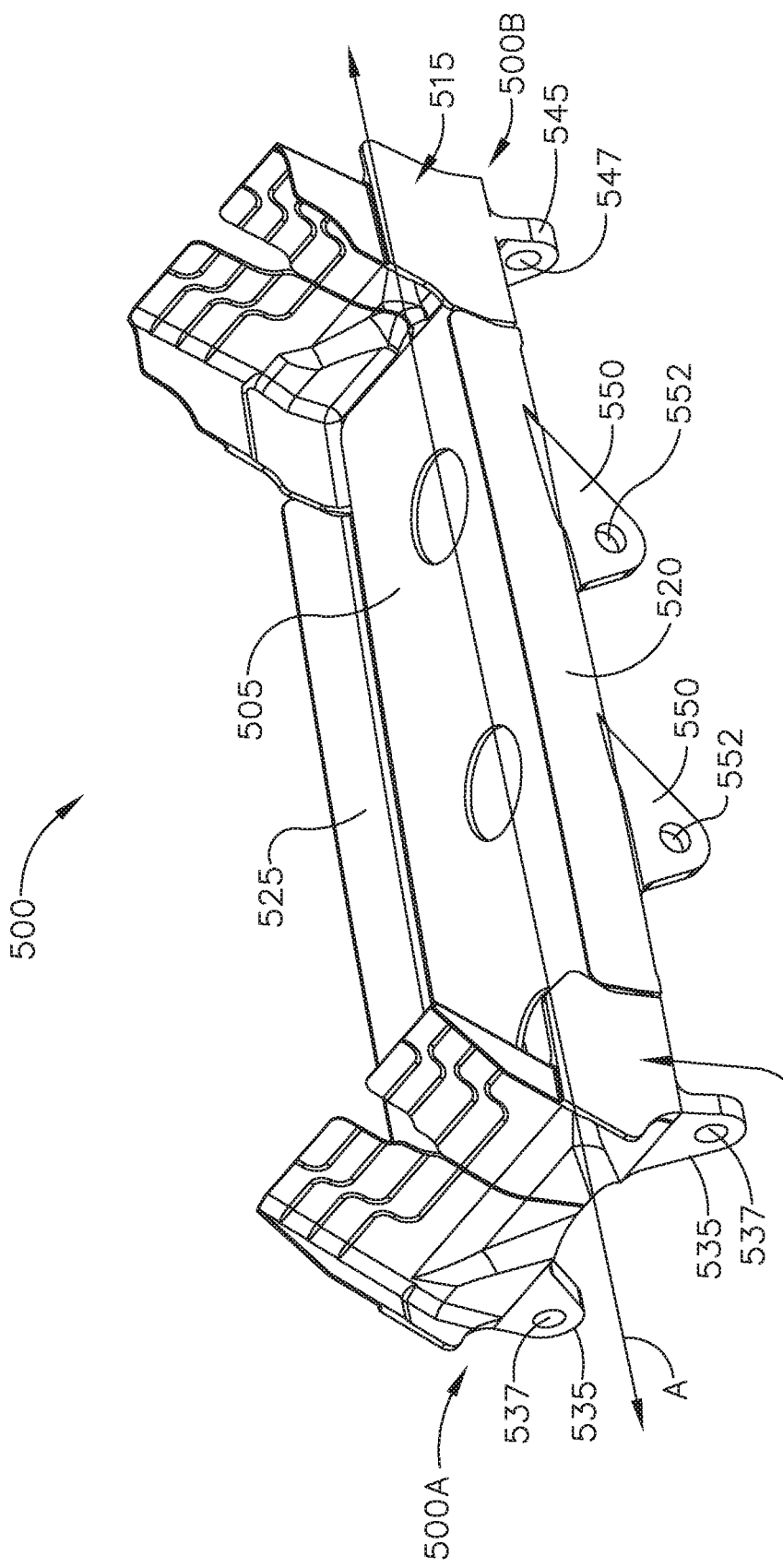
FIG. 18 is a front perspective view of a third example base rib assembly.
Figure 19:
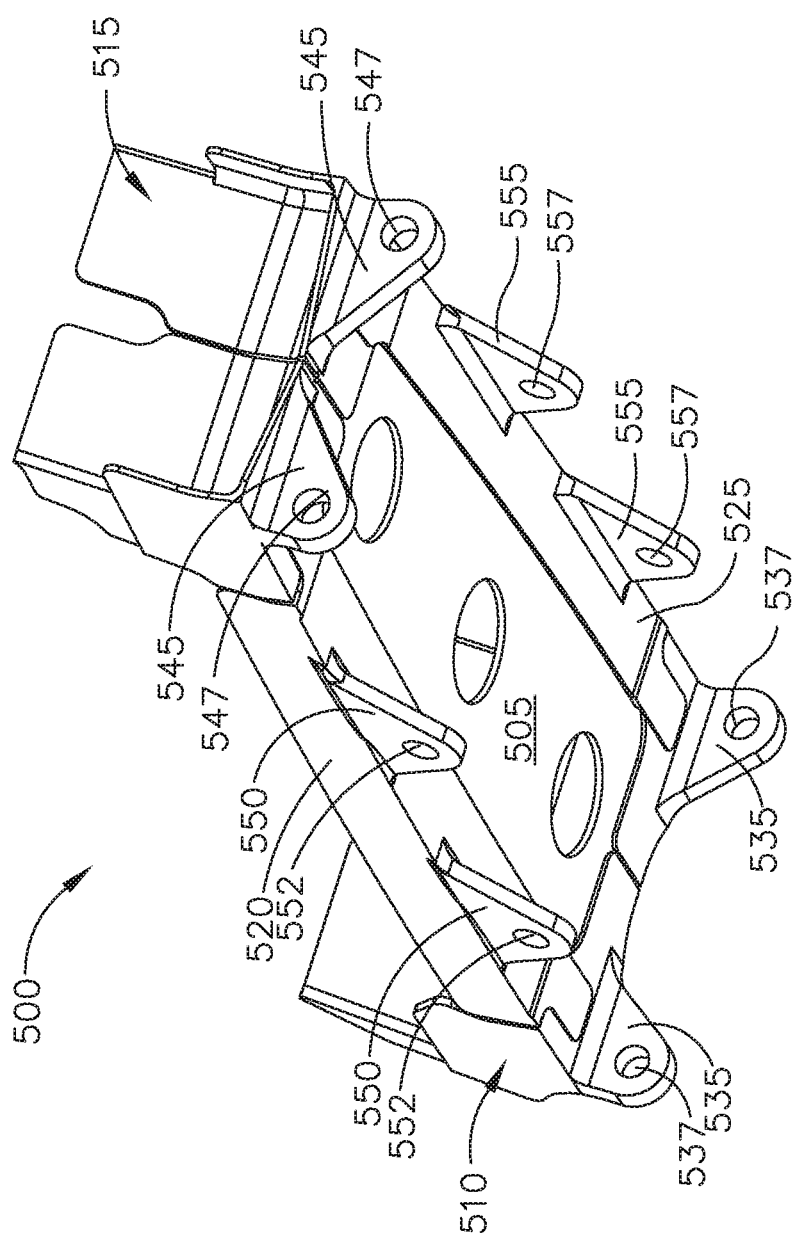
FIG. 19 is a rear perspective view of the base rib assembly of FIG. 18.

Referring to FIGS. 18-24, a third example connection between aircraft fuselage 15 and multi-spar box 40 of vertical stabilizer 35 is shown. As best seen in FIGS. 18-19, a base rib assembly 500 has a base rib 505 and a front terminal fitting 510, rear terminal fitting 515 opposite front terminal fitting 510, first side chord 520, and second side chord 525 opposite first side chord 520, attached to base rib 505. Front terminal fitting 510 includes a pair of front lateral lugs 535 extending perpendicular to longitudinal axis A. As shown, front terminal fitting 110 is two pieces, each having one front lateral lug 535, but could also be a single, unitary piece having both front lateral lugs 535, as shown and described in previous examples. Rear terminal fitting 515 includes a pair of rear lateral lugs 545 extending perpendicular to longitudinal axis A. As shown, rear terminal fitting 515 is two pieces, each having one rear lateral lug 545, but could also be a single unitary piece having both rear lateral lugs 545, as shown and described in previous examples. First side chord 520 has at least one first middle longitudinal lug 550 extending parallel to longitudinal axis A and second side chord 525 has at least one second middle longitudinal lug 555, opposite first longitudinal lug 550. As shown, first side chord 520 has two first longitudinal lugs 550 and second side chord 525 has two second longitudinal lugs 555, however, first and second side chords 520, 525 can have any number of longitudinal lugs desired for a particular application. In addition, in the particular example shown, there are no lateral lugs positioned between first longitudinal lugs 550 and second longitudinal lugs 555. Therefore, in the example shown in FIGS. 18-19, base rib assembly 500 has at least one pair of opposing middle longitudinal lugs 550, 555 disposed between a front 500A of base rib assembly 500 and a rear 500B of base rib assembly 500, a pair of front lateral lugs 535 positioned along front 500A of base rib assembly 500, and a pair of rear lateral lugs 545 positioned along rear 500B of base rib assembly 500.

Figure 20:
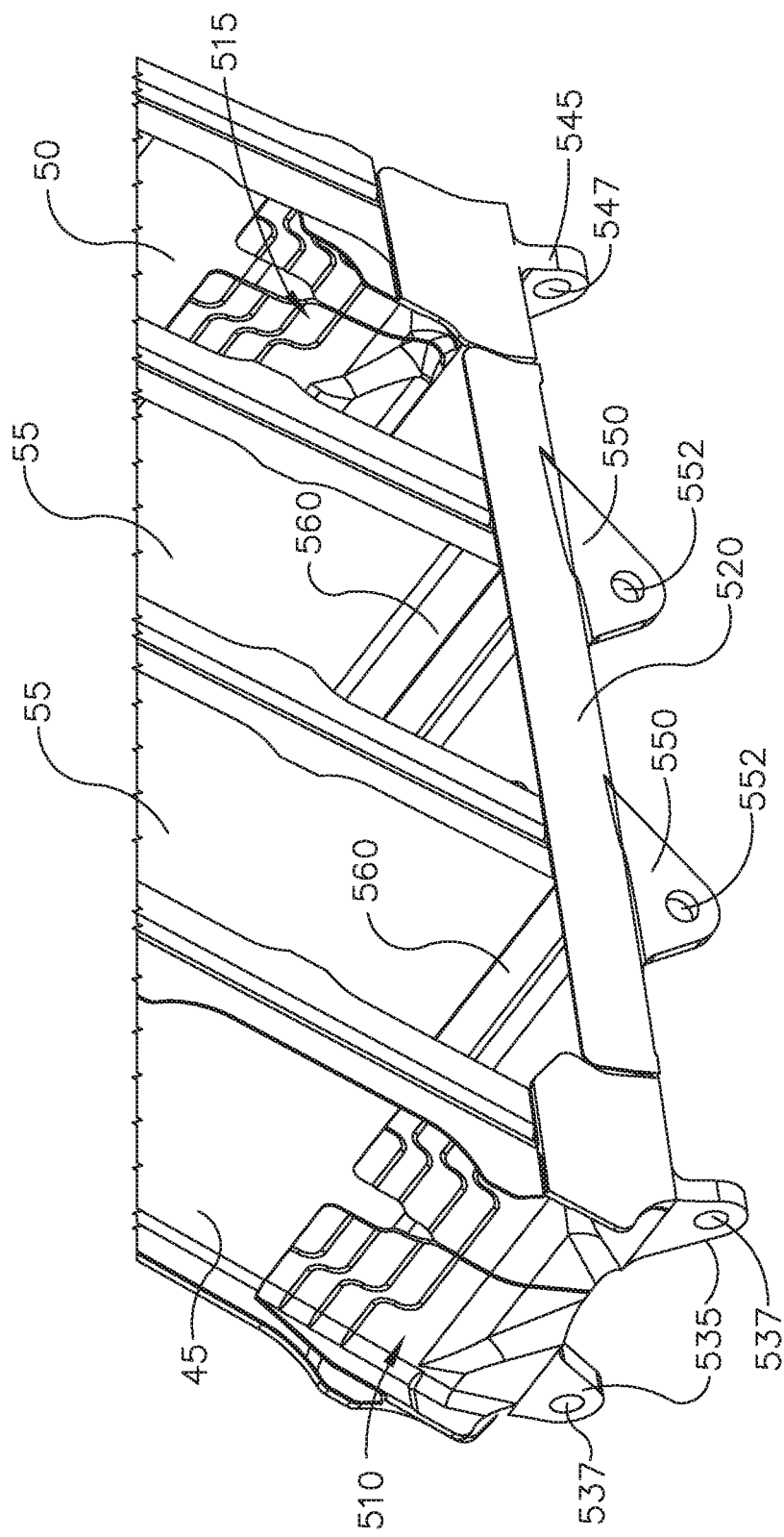
FIG. 20 is a front perspective view of the base rib assembly of FIG. 18 positioned within the multi-spar box of FIG. 2 with a side skin removed.
Figure 21:
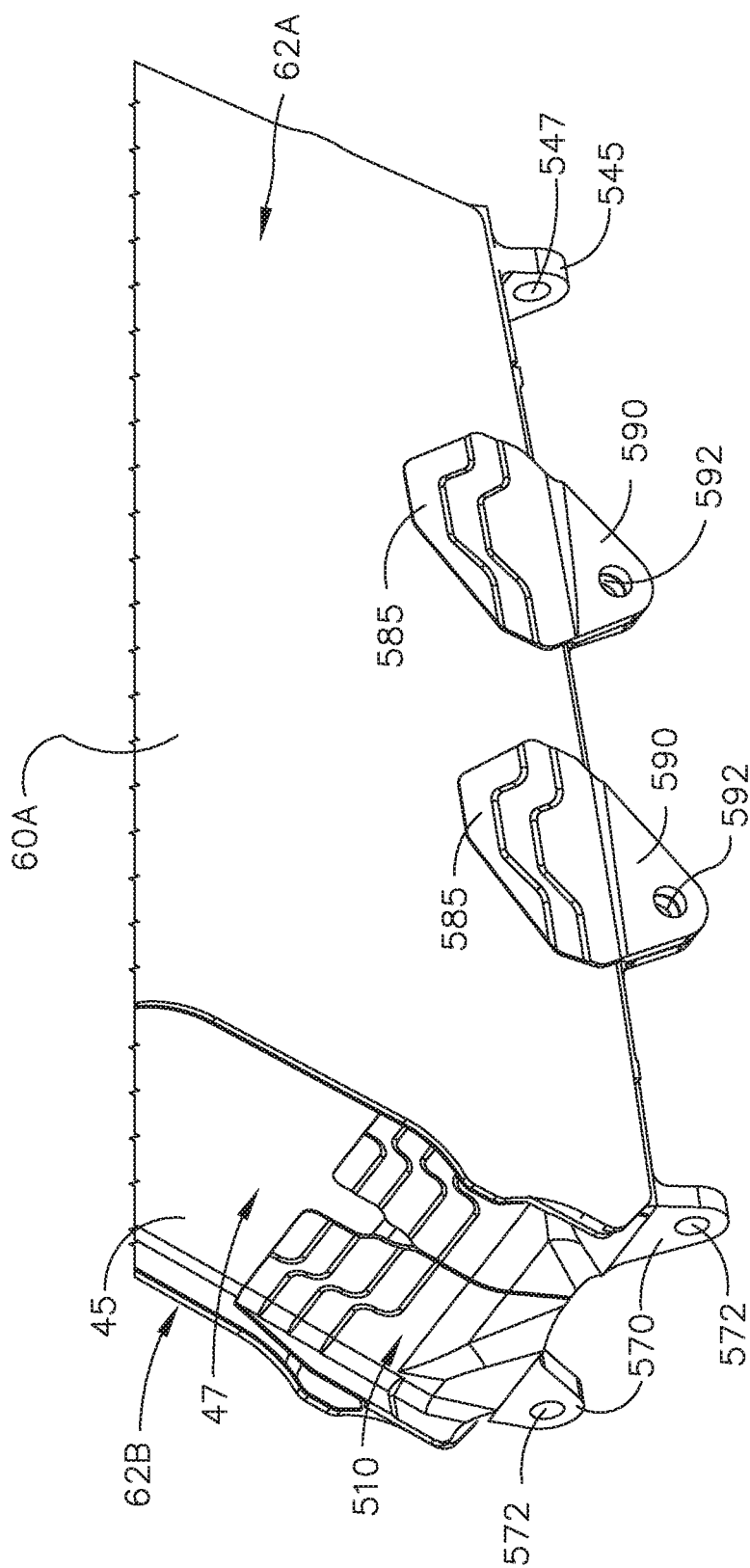
FIG. 21 is a front perspective view of the base rib assembly of FIG. 18 fully assembled with the multi-spar box of FIG. 2.

As seen in FIGS. 20-21, base rib assembly 500 is positioned in interior 65 of multi-spar box 40 with first side chord 520 positioned inside first side skin 60A, second side chord 525 positioned inside second side skin 60B, front terminal fitting 510 positioned adjacent exterior surface 47, or an interior surface, of front spar 45, and rear terminal fitting 515 positioned adjacent an interior surface, or exterior surface 52, of rear spar 50 and base rib assembly 500 secured to multi-spar box 40. For example, front terminal fitting 510 of base rib assembly 500 can be secured to front spar 45 of multi-spar box 40 with screws, bolts, welding, or any other well-known securement method. Similarly, rear terminal fitting 515 can be secured to rear spar 50 with screws, bolts, welding, or any other well-known securement method. In addition, mid spars 55 can be secured to base rib assembly 500 by attaching L-shaped shear clips 560 between base rib 505 and/or first and second side chords 520, 525 of base rib assembly 500 and mid spars 55 with screws, bolts, welding, or any other well-known securement method.

Referring to FIG. 21, with base rib assembly 500 positioned in multi-spar box 40 as described above, first side plates 585 are positioned adjacent exterior surface 62A of first side skin 60A and are secured to first side skin 60A and base rib assembly 500, for example, by screws that are threaded through first side plates 585, first side skin 60A, and first side chord 520. Alternatively, first side plates 585 can be secured to first side skin 60A and base rib assembly 500 by bolts, welding, or any other well-known securement method. Each first side plate 585 includes a longitudinal lug 590 that is adjacent to and aligned with a corresponding first middle longitudinal lug 550. In the example shown, there are two first side plates 585 since there are two first middle longitudinal lugs 550. However, there could be any number of first side plates 585 as required for the number of first middle longitudinal lugs 550. In addition, rather than individual first side plates 585, a single, unitary piece first side plate could be used that has multiple longitudinal lugs that each correspond to a first middle longitudinal lug. Corresponding second side plates (not shown) are also positioned adjacent exterior surface 62B of second side skin 60B, opposite corresponding first side plates 585, and are secured to second side skin 60B and base rib assembly 500, for example, by screws that are threaded through the second side plates, second side skin 60B, and second side chord 525. Alternatively, second side plates can be secured to second side skin 60B and base rib assembly 500 by bolts, welding, or any other well-known securement method. Each second side plate includes a longitudinal lug that is adjacent to and aligned with a corresponding second middle longitudinal lug 555. As with first side plates 585, there could be any number of second side plates as required for the number of second middle longitudinal lugs 555 or, rather than individual second side plates, a single, unitary piece second side plate could be used that has multiple longitudinal lugs that each correspond to a second middle longitudinal lug 555.

Figure 22:
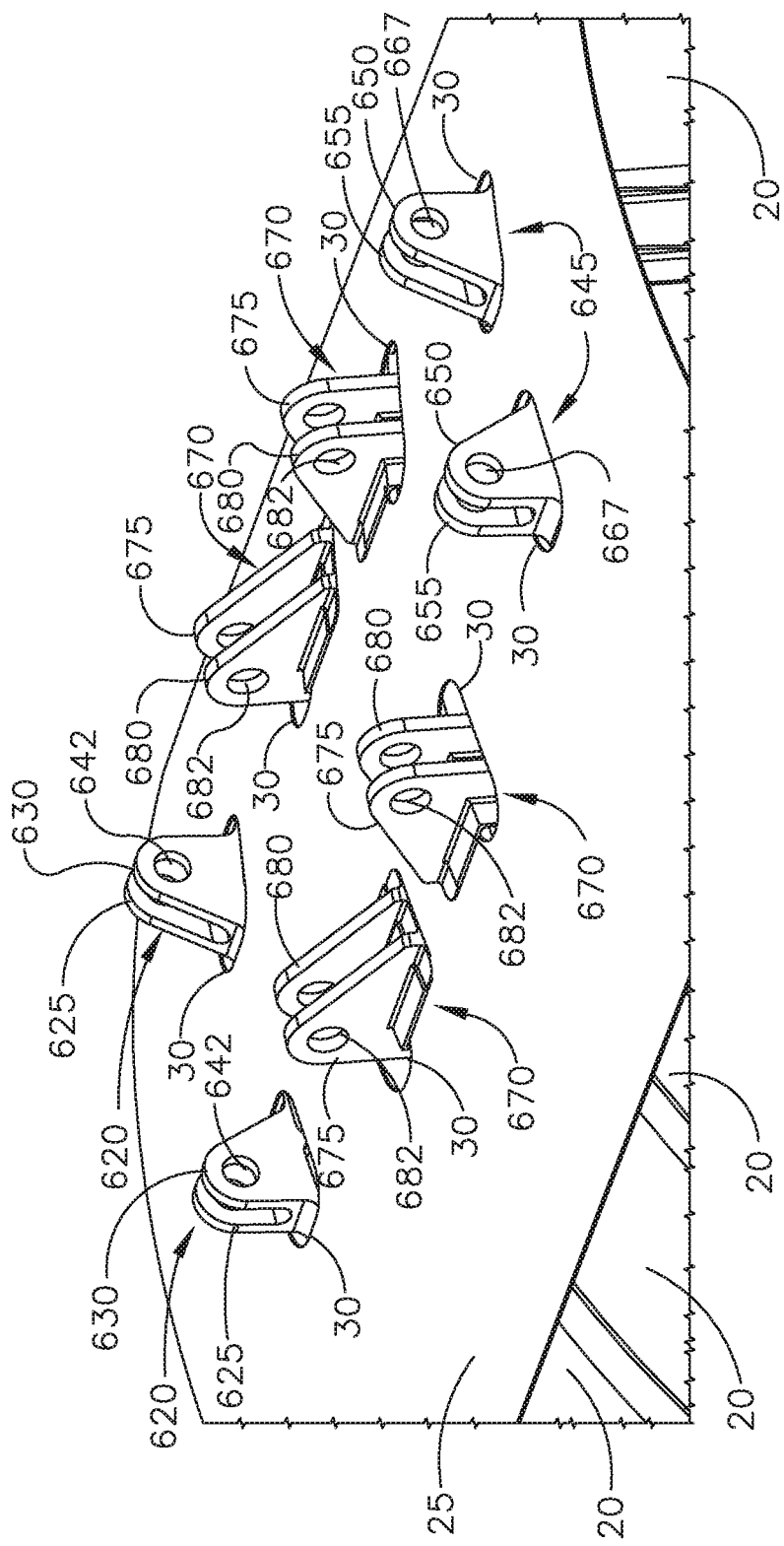
FIG. 22 is a partial illustration of a portion of the fuselage of the aircraft of FIG. 1 with a third set of exemplary clevises.

Referring to FIG. 22, a pair of front clevises 620 correspond to the pair of front lateral lugs 535 and each front clevis 620 extends through a corresponding aperture 30 in outer skin 25 and is secured to a frame member 20 of aircraft fuselage 15. In the example shown, front clevises 620 each have first and second mounting arms 625, 630. Similarly, a pair of rear clevises 645 correspond to the pair of rear lateral lugs 545 and each rear clevis 645 extends through a corresponding aperture 30 in outer skin 25 and is secured to a frame member 20 of aircraft fuselage 15. In the example shown, rear clevises 645 each have first and second mounting arms 655, 655. Pairs of middle clevises 670 correspond to the pairs of middle longitudinal lugs 550, 555 and each middle clevis 670 extends through a corresponding aperture 30 in outer skin 25 and is secured to a frame member 20 of aircraft fuselage 15. Middle clevises 670 each have first and second mounting arms 675, 680.

Figure 23:
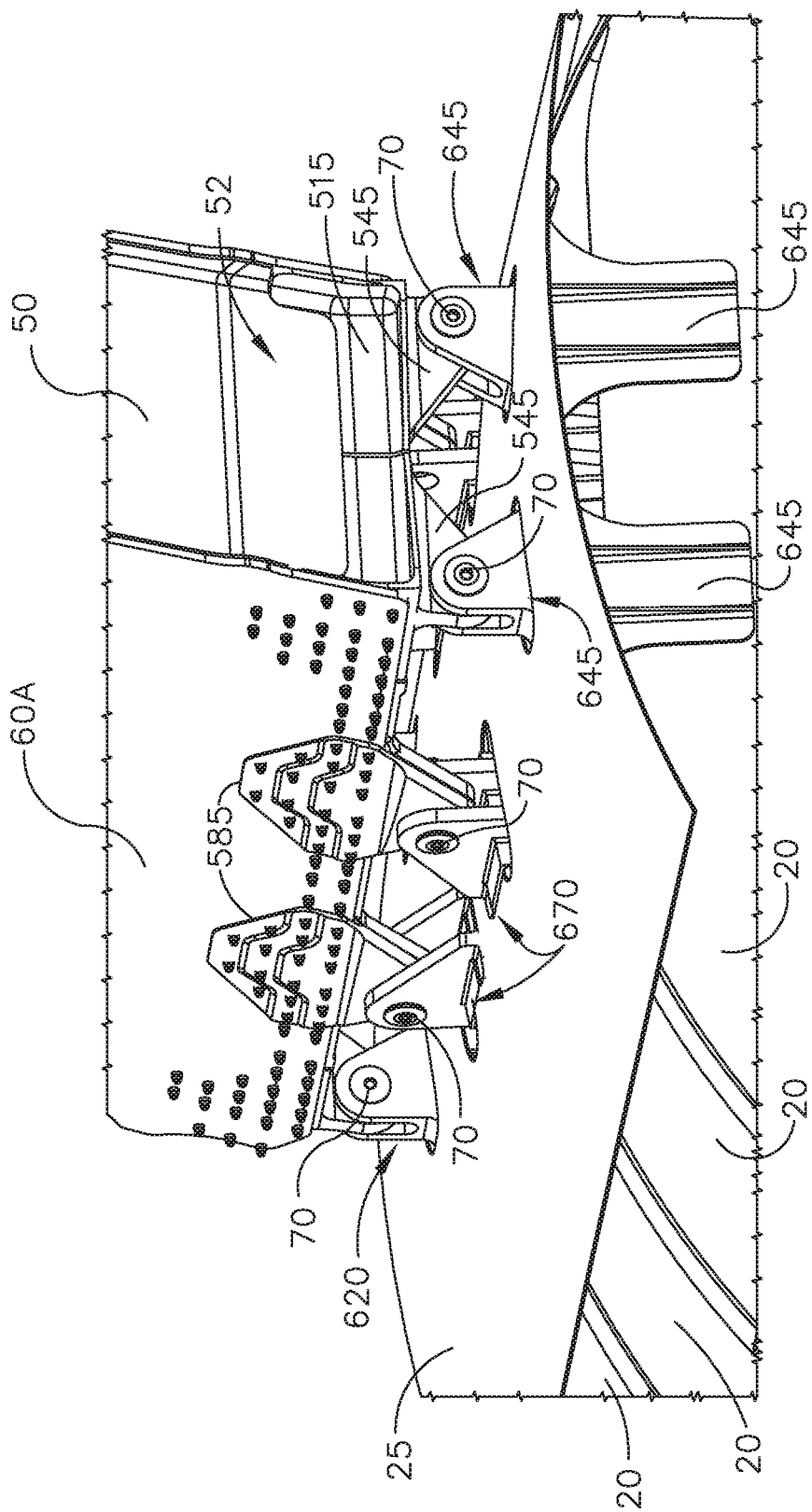
FIG. 23 is rear perspective view of the multi-spar box and base rib assembly of FIG. 21 connected to the fuselage of FIG. 22.
Figure 24:
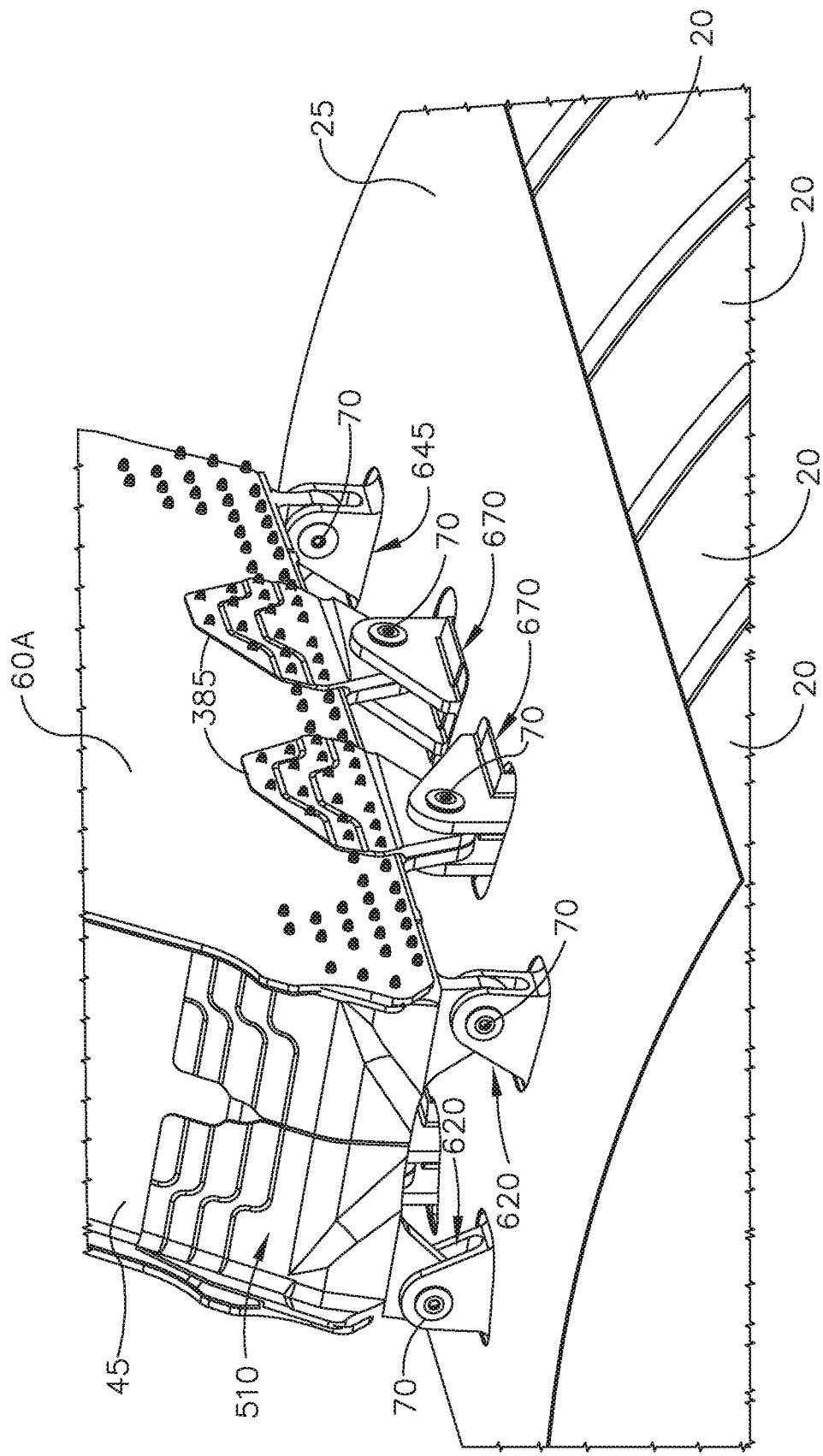
FIG. 24 is a front perspective view of the multi-spar box, base rib assembly, and fuselage of FIG. 23.

Referring to FIGS. 23-24, longitudinal lugs 590 of first side plates 585 and corresponding first middle longitudinal lugs 550 of base rib assembly 500 are positioned between first mounting arm 675 and second mounting arm 680 of the corresponding middle clevis 670 and longitudinal lugs of second side plates (now shown) and corresponding second middle longitudinal lugs 555 of base rib assembly 500 are positioned between first mounting arm 675 and second mounting arm 680 of the corresponding middle clevis 670. Retaining members 70, such as bolts, pins, etc., are inserted through mounting holes 552, 557 in each middle longitudinal lug 550, 555, mounting holes 592 in first side plate 585 and second side plate, and mounting holes 682 in each mounting arm 675, 680 of each corresponding middle clevis 670 to secure vertical stabilizer 35 to aircraft fuselage 15.

In addition, to provide lateral support for vertical stabilizer 35, front lateral lugs 535 of base rib assembly 500 are positioned between first mounting arm 625 and second mounting arm 630 of the corresponding front clevis 620. Retaining members 70, such as bolts, pins, etc., are inserted through mounting holes 537 in each front lateral lug 535 and mounting holes 642 in each mounting arm 625, 630 of each corresponding front clevis 620 to secure vertical stabilizer 35 to aircraft fuselage 15.

In addition, rear lateral lugs 545 of base rib assembly 500 are positioned between first mounting arm 655 and second mounting arm 655 of the corresponding rear clevis 645. Retaining members 70 such as bolts, pins, etc., are inserted through mounting holes 547 in each rear lateral lug 545 and mounting holes 667 in each mounting arm 655, 655 of each corresponding rear clevis 645 to secure vertical stabilizer 35 to aircraft fuselage 15.

To attach vertical stabilizer 35 to aircraft fuselage 15 as discussed above, base rib assembly 500 is first assembled, which, as discussed above, has at least one pair of opposing middle longitudinal lugs 550, 555 disposed between front 500A and rear 500B of base rib assembly 500, and pairs of front and rear lateral lugs 535, 545 disposed along front 500A and rear 500B of base rib assembly 500, respectively, each of which have a corresponding mounting hole 552, 557, 537, 547. To assemble base rib assembly 500, first side chord 520 is attached to base rib 505, second side chord 525 is attached to base rib 505, opposite first side chord 520, front terminal fitting 510 is attached to base rib 505, and rear terminal fitting 515 is attached to base rib 505, opposite front terminal fitting 510. Base rib assembly 500 is then inserted into interior 65 of multi-spar box 40 of vertical stabilizer 35 and L-shaped shear clips 560 are attached between mid spars 55 and base rib assembly 500.

First side plate 585 is then positioned adjacent exterior surface 62A of first side skin 60A of multi-spar box 40 and is secured to first side skin 60A and base rib assembly 500, and the second side plate is positioned adjacent exterior surface 62B of second side skin 60B of multi-spar box 40 and is secured to second side skin 60B and base rib assembly 500.

Front clevises 620, rear clevises 645, and middle clevises 670 are inserted through corresponding apertures 30 in outer skin 25 of aircraft fuselage 15 and are secured to corresponding frame members 20 of aircraft fuselage 15, for example, with bolts, screws, rivets, welding, etc. Front clevises 620 correspond to front lateral lugs 535 and each have first and second mounting arms 625, 630 with mounting holes 642 and rear clevises 645 correspond to rear lateral lugs 545 and each have first and second mounting arms 655, 655 with mounting holes 667. Middle clevises 670 correspond to middle longitudinal lugs 550, 555 and each have first and second mounting arms 675, 680 with mounting holes 682.

Vertical stabilizer 35 is then positioned adjacent aircraft fuselage 15 such that each front and rear lateral lug 535, 545 and middle longitudinal lug 550, 555 is aligned with a corresponding front, rear, or middle clevis 620, 645, 670 and retaining members 70 are inserted through mounting holes 537, 547, 552, 557 of each lug 535, 545, 550, 555 and mounting holes 642, 667, 682 of each corresponding clevis 620, 645, 670 to secure vertical stabilizer 35 to aircraft fuselage 15.

While various embodiments have been described above, this disclosure is not intended to be limited thereto. Variations can be made to the disclosed embodiments that are still within the scope of the appended claims.

What is claimed:

1. An aircraft, comprising:
an aircraft fuselage having a plurality of frame members and an outer skin;
a vertical stabilizer having a multi-spar box, the multi-spar box including a front spar, a rear spar, at least one mid spar positioned between and spaced apart from the front and rear spars, a first side skin extending between the front and rear spar, and a second side skin, opposite the first side skin, extending between the front and rear spar, the front and rear spars and the first and second side skins defining an interior of the multi-spar box;
a base rib assembly positioned in an interior of the multi-spar box and secured to the multi-spar box, the base rib assembly having at least one pair of opposing middle longitudinal lugs disposed between a front of the base rib assembly and a rear of the base rib assembly, a pair of front lateral lugs positioned along the front of the base rib assembly, and a pair of rear lateral lugs positioned along the rear of the base rib assembly, wherein the base rib assembly does not have any lateral lugs between the pairs of middle longitudinal lugs and does not have any longitudinal lugs adjacent the front lateral lugs or rear lateral lugs at the front of the base rib assembly and the rear of the base rib assembly;
a pair of middle clevises corresponding to the pair of middle longitudinal lugs, the middle clevises extending through corresponding apertures in the outer skin and secured to one of the plurality of frame members; and
a plurality of retaining members inserted through mounting holes in each middle longitudinal lug and through mounting holes in each corresponding middle clevis to secure the vertical stabilizer to the aircraft fuselage.

2. The aircraft of claim 1, comprising:
a front lateral clevis positioned between the pair of front lateral lugs, the front lateral clevis extending through an aperture in the outer skin and secured to one of the plurality of frame members;
a rear lateral clevis positioned between the pair of rear lateral lugs, the rear lateral clevis extending through an aperture in the outer skin and secured to one of the plurality of frame members;
a first front link interconnecting the front lateral clevis and a first front lateral lug of the pair of front lateral lugs and a second front link interconnecting the front lateral clevis and a second front lateral lug of the pair of front lateral lugs; and
a first rear link interconnecting the rear lateral clevis and a first rear lateral lug of the pair of rear lateral lugs and a second rear link interconnecting the rear lateral clevis and a second rear lateral lug of the pair of rear lateral lugs.

3. The aircraft of claim 1, comprising:
a front plate adjacent an exterior surface of the front spar and secured to the front spar and the base rib assembly, the front plate having a pair of lateral lugs adjacent to and aligned with the pair of front lateral lugs of the base rib assembly;
a rear plate adjacent an exterior surface of the rear spar, opposite the front plate, and secured to the rear spar and the base rib assembly, the rear plate having a pair of lateral lugs adjacent to and aligned with the pair of rear lateral lugs of the base rib assembly;
a first side plate adjacent an exterior surface of the first side skin and secured to the first side skin and the base rib assembly, the first side plate having at least one longitudinal lug adjacent to and aligned with one of the pair of opposing middle longitudinal lugs of the base rib assembly; and
a second side plate adjacent an exterior surface of the second side skin and secured to the second side skin and the base rib assembly, the second side plate having at least one longitudinal lug adjacent to and aligned with the other of the pair of opposing middle longitudinal lugs of the base rib assembly.

4. An aircraft, comprising:
an aircraft fuselage having a plurality of frame members and an outer skin;
a vertical stabilizer having a multi-spar box, the multi-spar box including a front spar, a rear spar, at least one mid spar positioned between and spaced apart from the front and rear spars, a first side skin extending between the front and rear spar, and a second side skin, opposite the first side skin, extending between the front and rear spar, the front and rear spars and the first and second side skins defining an interior of the multi-spar box;
a base rib assembly positioned in an interior of the multi-spar box and secured to the multi-spar box, the base rib assembly comprising a pair of opposing front longitudinal lugs and a pair of opposing rear longitudinal lugs, at least one pair of opposing middle longitudinal lugs disposed between the pair of front longitudinal lugs and the pair of rear longitudinal lugs, a pair of front lateral lugs positioned along a front of the base rib assembly between the pair of front longitudinal lugs, and a pair of rear lateral lugs positioned along a rear of the base rib assembly between the pair of rear longitudinal lugs, wherein the base rib assembly does not have any lateral lugs between the pairs of middle longitudinal lugs;
a first side plate adjacent an exterior surface of the first side skin and secured to the first side skin and the base rib assembly, the first side plate having at least one longitudinal lug adjacent to and aligned with one of the pair of opposing middle longitudinal lugs;
a second side plate adjacent an exterior surface of the second side skin and secured to the second side skin and the base rib assembly, the second side plate having at least one longitudinal lug adjacent to and aligned with the other of the pair of opposing middle longitudinal lugs of the base rib assembly;
a pair of middle clevises corresponding to the pair of middle longitudinal lugs, the middle clevises extending through corresponding apertures in the outer skin and secured to one of the plurality of frame members; and
a plurality of retaining members inserted through mounting holes in each middle longitudinal lug and through mounting holes in each corresponding middle clevis to secure the vertical stabilizer to the aircraft fuselage.

5. The aircraft of claim 4, comprising:
a pair of front clevises corresponding to the pair of front longitudinal lugs, the front clevises extending through corresponding apertures in the outer skin and secured to one of the plurality of frame members;
a pair of rear clevises corresponding to the pair of rear longitudinal lugs, the rear clevises extending through corresponding apertures in the outer skin and secured to one of the plurality of frame members; and
a plurality of retaining members inserted through mounting holes in each front and rear longitudinal lug and through mounting holes in each corresponding front and rear clevis to secure the vertical stabilizer to the aircraft fuselage.

6. The aircraft of claim 5, comprising:
a front lateral clevis positioned between the pair of front clevises, the front lateral clevis extending through an aperture in the outer skin and secured to one of the plurality of frame members;
a rear lateral clevis positioned between the pair of rear clevises, the rear lateral clevis extending through an aperture in the outer skin and secured to one of the plurality of frame members;
a first front link interconnecting the front lateral clevis and a first front lateral lug of the pair of front lateral lugs and a second front link interconnecting the front lateral clevis and a second front lateral lug of the pair of front lateral lugs; and
a first rear link interconnecting the rear lateral clevis and a first rear lateral lug of the pair of rear lateral lugs and a second rear link interconnecting the rear lateral clevis and a second rear lateral lug of the pair of rear lateral lugs.

7. The aircraft of claim 5, comprising:
a first front link interconnecting a first front lateral lug of the pair of front lateral lugs and a lateral wall of one of the pair of front clevises and a second front link interconnecting a second front lateral lug of the pair of front lateral lugs and a lateral wall of the other of the pair of front clevises; and
a first rear link interconnecting a first rear lateral lug of the pair of rear lateral lugs and a lateral wall of one of the pair of rear clevises and a second rear link interconnecting a second rear lateral lug of the pair of rear lateral lugs and lateral wall of the other of the pair of rear clevises.

8. The aircraft of claim 5, comprising:
a front plate adjacent an exterior surface of the front spar and secured to the front spar and the base rib assembly, the front plate having a pair of lateral lugs adjacent to and aligned with the pair of front lateral lugs of the base rib assembly;
a rear plate adjacent an exterior surface of the rear spar, opposite the front plate, and secured to the rear spar and the base rib assembly, the rear plate having a pair of lateral lugs adjacent to and aligned with the pair of rear lateral lugs of the base rib assembly;
a third side plate and a fifth side plate adjacent an exterior surface of the first side skin and secured to the first side skin and the base rib assembly, the third side plate having at least one longitudinal lug adjacent to and aligned with one of the pair of opposing front longitudinal lugs, and the fifth side plate having at least one longitudinal lug adjacent to and aligned with one of the pair of opposing rear longitudinal lugs; and
a fourth side plate and a sixth side plate adjacent an exterior surface of the second side skin and secured to the second side skin and the base rib assembly, the fourth side plate having at least one longitudinal lug adjacent to and aligned with the other of the pair of opposing front longitudinal lugs, and the sixth side plate having at least one longitudinal lug adjacent to and aligned with the other of the pair of opposing rear longitudinal lugs.

9. The aircraft of claim 8, wherein:
each front clevis has a first mounting arm, a second mounting arm, and a third mounting arm;
each rear clevis has a first mounting arm, a second mounting arm, and a third mounting arm;
each middle clevis has only a first mounting arm and a second mounting arm;
the longitudinal lug of the first side plate and the corresponding middle longitudinal lug of the base rib assembly are positioned between the first mounting arm and the second mounting arm of the corresponding middle clevis;
the longitudinal lug of the second side plate and the corresponding middle longitudinal lug of the base rib assembly are positioned between the first mounting arm and the second mounting arm of the corresponding middle clevis;
the longitudinal lug of the third side plate is positioned between the first mounting arm and the second mounting arm of the corresponding front clevis and the corresponding front longitudinal lug of the base rib assembly is positioned between the second mounting arm and the third mounting arm of the corresponding front clevis; and
the longitudinal lug of the fifth side plate is positioned between the first mounting arm and the second mounting arm of the corresponding rear clevis and the corresponding rear longitudinal lug of the base rib assembly is positioned between the second mounting arm and the third mounting arm of the corresponding rear clevis.

10. The aircraft of claim 9, comprising:
a front lateral clevis positioned between the pair of front clevises, the front lateral clevis extending through an aperture in the outer skin and secured to one of the plurality of frame members;
a rear lateral clevis positioned between the pair of rear clevises, the rear lateral clevis extending through an aperture in the outer skin and secured to one of the plurality of frame members;
a first front link interconnecting the front lateral clevis and a first front lateral lug of the pair of front lateral lugs and a second front link interconnecting the front lateral clevis and a second front lateral lug of the pair of front lateral lugs; and
a first rear link interconnecting the rear lateral clevis and a first rear lateral lug of the pair of rear lateral lugs and a second rear link interconnecting the rear lateral clevis and a second rear lateral lug of the pair of rear lateral lugs.

11. The aircraft of claim 9, comprising:
a first front link interconnecting a first front lateral lug of the pair of front lateral lugs and a lateral wall of one of the pair of front clevises and a second front link interconnecting a second front lateral lug of the pair of front lateral lugs and a lateral wall of the other of the pair of front clevises; and
a first rear link interconnecting a first rear lateral lug of the pair of rear lateral lugs and a lateral wall of one of the pair of rear clevises and a second rear link interconnecting a second rear lateral lug of the pair of rear lateral lugs and lateral wall of the other of the pair of rear clevises.

12. A method of attaching a vertical stabilizer having a multi-spar box to an aircraft fuselage, the method comprising the steps of:
assembling a base rib assembly having at least one pair of opposing middle longitudinal lugs disposed between a front of the base rib assembly and a rear of the base rib assembly, a pair of front lateral lugs positioned along the front of the base rib assembly, and a pair of rear lateral lugs positioned along the rear of the base rib assembly, each longitudinal lug and each lateral lug having a corresponding mounting hole, wherein the base rib assembly does not have any lateral lugs between the pairs of middle lugs;
inserting the base rib assembly into an interior of the multi-spar box of the vertical stabilizer, the interior of the multi-spar box defined by a front spar, a rear spar, and opposing side skins;
positioning a front plate adjacent an exterior surface of the front spar and securing the front plate to the front spar and the base rib assembly, the front plate having a pair of lateral lugs corresponding to the pair of front lateral lugs of the base rib assembly, the lateral lugs of the front plate each having a mounting hole that aligns with the mounting holes in the corresponding lateral lugs of the base rib assembly;
positioning a rear plate adjacent an exterior surface of the rear spar, opposite the front plate, and securing the rear plate to the rear spar and the base rib assembly, the rear plate having a pair of rear lateral lugs corresponding to the pair of rear lateral lugs of the base rib assembly, the lateral lugs of the rear plate each having a mounting hole that aligns with the mounting holes in the corresponding lateral lugs of the base rib assembly;
positioning a first side plate adjacent an exterior surface of a first side skin of the multi-spar box and securing the first side plate to the first side skin and the base rib assembly, the first side plate having at least one longitudinal lug corresponding to one of the pair of opposing middle longitudinal lugs of the base rib assembly, each of the at least one longitudinal lug of the first side plate having a mounting hole that aligns with the mounting hole in the corresponding middle longitudinal lug of the base rib assembly;
positioning a second side plate adjacent an exterior surface of a second side skin of the multi-spar box and securing the second side plate to the second side skin and the base rib assembly, the second side plate having at least one longitudinal lug corresponding to the other of the pair of opposing middle longitudinal lugs of the base rib assembly, each of the at least one longitudinal lug of the second side plate having a mounting hole that aligns with the mounting hole in the corresponding middle longitudinal lug of the base rib assembly;
inserting a plurality of clevises through corresponding apertures in a skin of the aircraft fuselage and securing each of the plurality of clevises to a frame member of the aircraft fuselage, each clevis having a pair of mounting arms, each mounting arm having a mounting hole;
positioning the vertical stabilizer adjacent the aircraft fuselage and aligning each middle longitudinal lug with a corresponding clevis; and
inserting a retaining member through the mounting hole of each corresponding middle longitudinal lug and clevis to secure the vertical stabilizer to the aircraft fuselage.

13. The method of claim 12, comprising the step of attaching each lateral lug to a first end of a corresponding lateral link and attaching a second end of each lateral link to a lateral clevis.

14. The method of claim 13, wherein each lateral clevis extends through a corresponding aperture in the skin of the aircraft fuselage and is secured to a frame member of the aircraft fuselage.

15. The method of claim 13, wherein the base rib assembly comprises a pair of opposing front longitudinal lugs and a pair of rear longitudinal lugs.

16. The method of claim 15, wherein each lateral clevis is part of a clevis corresponding to a front longitudinal lug or a rear longitudinal lug.

17. The method of claim 15, wherein a first lateral clevis is positioned between the pair of opposing front longitudinal lugs and a second lateral clevis is positioned between the pair of rear longitudinal lugs.

18. The method of claim 12, wherein assembling the base rib assembly comprises:
attaching at least one first side chord to a base rib, the at least one first side chord including at least one of the longitudinal lugs;
attaching at least one second side chord to the base rib, opposite the at least one first side chord, the at least one second side chord including at least one of the longitudinal lugs;
attaching a front terminal fitting to the base rib, the front terminal fitting including the pair of front lateral lugs; and
attaching a rear terminal fitting to the base rib, opposite the front terminal fitting, the rear terminal fitting including the pair of rear lateral lugs.

19. The method of claim 12, further comprising attaching at least one generally L-shaped shear clip between the base rib assembly and a mid spar of the multi-spar box.

20. The method of claim 15, wherein:
the clevises corresponding to the front longitudinal lugs and the rear longitudinal lugs each have a third mounting arm positioned between and spaced apart from the pair of mounting arms, the third mounting arm having a mounting hole aligned with the mounting holes in the pair of mounting arms; and
the clevises corresponding to the middle longitudinal lugs do not have any additional mounting arms other than the pair of mounting arms.

* * * * *